(12) United States Patent
Yahagi

(10) Patent No.: US 7,519,903 B2
(45) Date of Patent: Apr. 14, 2009

(54) CONVERTING A STRUCTURED DOCUMENT USING A HASH VALUE, AND GENERATING A NEW TEXT ELEMENT FOR A TREE STRUCTURE

(75) Inventor: Hironori Yahagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 809 days.

(21) Appl. No.: 09/819,729

(22) Filed: Mar. 29, 2001

(65) Prior Publication Data

US 2002/0038319 A1   Mar. 28, 2002

(30) Foreign Application Priority Data

Sep. 28, 2000  (JP)  .............................. 2000-296161

(51) Int. Cl.
*G06F 15/00* (2006.01)
(52) U.S. Cl. .................... 715/234; 715/242; 707/101
(58) Field of Classification Search ......... 715/513–514, 715/522–523, 234, 239, 242, 248–249, 252, 715/236, 760; 707/3, 100, 101
See application file for complete search history.

(56) References Cited

U.S. PATENT DOCUMENTS

| | | | | |
|---|---|---|---|---|
| 5,475,588 A | * | 12/1995 | Schabes et al. ................ | 704/9 |
| 5,884,320 A | * | 3/1999 | Agrawal et al. .......... | 707/104.1 |
| 6,023,714 A | * | 2/2000 | Hill et al. ..................... | 715/513 |
| 6,105,044 A | * | 8/2000 | DeRose et al. ............... | 715/514 |
| 6,167,397 A | * | 12/2000 | Jacobson et al. ................ | 707/5 |
| 6,167,409 A | * | 12/2000 | DeRose et al. ............... | 715/513 |
| 6,247,018 B1 | * | 6/2001 | Rheaume ..................... | 707/102 |
| 6,300,947 B1 | * | 10/2001 | Kanevsky ..................... | 715/866 |
| 6,336,124 B1 | * | 1/2002 | Alam et al. .................. | 715/523 |
| 6,405,211 B1 | * | 6/2002 | Sokol et al. .............. | 707/103 Y |
| 6,546,406 B1 | * | 4/2003 | DeRose et al. ............... | 715/513 |
| 6,647,141 B1 | * | 11/2003 | Li ............................... | 382/162 |
| 6,757,887 B1 | * | 6/2004 | Kaplan et al. ................ | 717/106 |
| 6,941,511 B1 | * | 9/2005 | Hind et al. ................... | 715/235 |
| 2001/0027455 A1 | * | 10/2001 | Abulleil et al. .............. | 707/102 |
| 2002/0003906 A1 | * | 1/2002 | Zeng et al. ................... | 382/240 |
| 2002/0029229 A1 | * | 3/2002 | Jakopac et al. .............. | 707/500 |
| 2002/0099684 A1 | * | 7/2002 | Ardoin et al. ................... | 707/1 |
| 2002/0143774 A1 | * | 10/2002 | Vandersluis ................... | 707/10 |
| 2005/0223320 A1 | * | 10/2005 | Brintzenhofe et al. ........ | 715/517 |

OTHER PUBLICATIONS

Arnaud Le Hors, W3C team, et al., "Document Object Model (DOM) Level 2 Core Specification" Version 1.0, Nov. 13, 2000.
Tim Bray, Textuality and Netscape, et al., "Extensible Markup Language (XML) 1.0 (Second Edition)", Oct. 6, 2000.
SAX 2.0: The Simple API for XML, May 1998.

* cited by examiner

*Primary Examiner*—Cesar B Paula
(74) *Attorney, Agent, or Firm*—Staas & Halsey LLP

(57) ABSTRACT

A new element is generated by joining the contents of elements relatively at the same position among a plurality of records of a structured document. Next, a new record that includes the new element and inherits the relative position relationship of the elements within the records is generated. The plurality of records are then replaced with the new record.

13 Claims, 28 Drawing Sheets

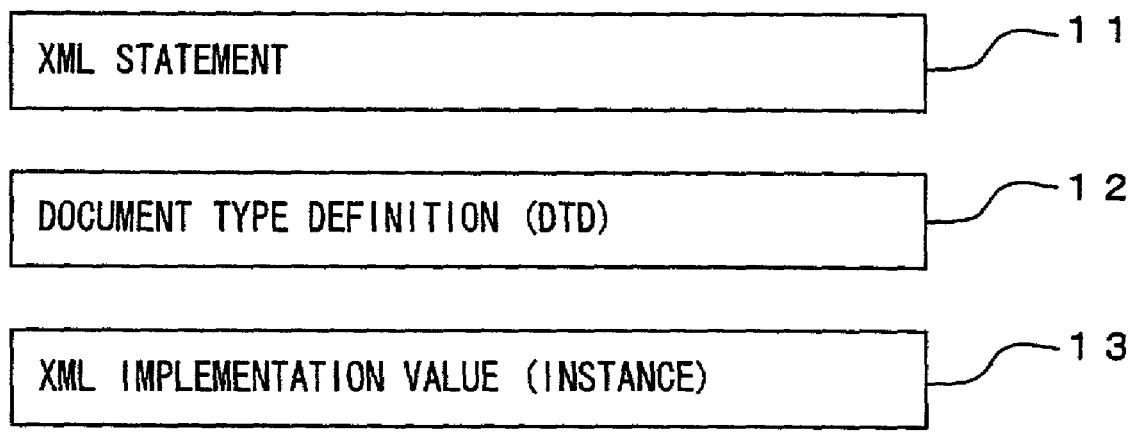
F I G. 1 A

21 <element name> (START TAG)
22 ELEMENT CONTENT (CONTENT OF ELEMENT)
</element name> (END TAG)

23 <element name/> (EMPTY ELEMENT TAG: TAG OF ELEMENT HAVING EMPTY CONTENT)

F I G. 1 B

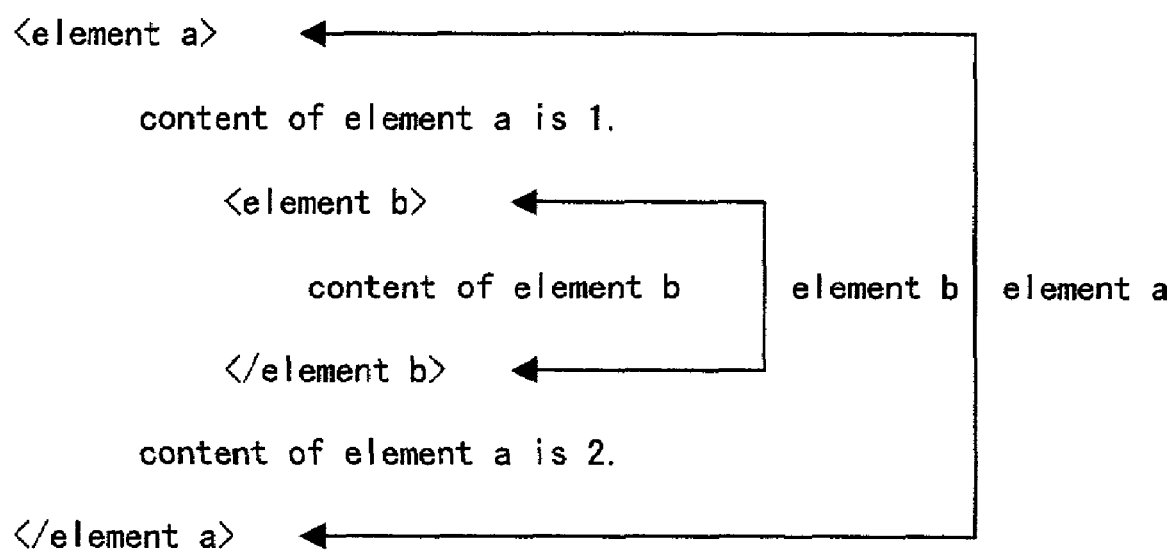
F I G. 1 C

|  | DECLARATION TYPE | DOCUMENT TYPE DEFINITION | IMPLEMENTATION VALUE |
|---|---|---|---|
| WELL-FORMED XML DOCUMENT | △ (XML DECLARATION) | △ | ○ |
| VALID XML DOCUMENT | △ (XML DECLARATION) | ○ | ○ |
| SGML DOCUMENT | ○ (SGML DECLARATION) | ○ | ○ |
| HTML DOCUMENT | △ (HTML DECLARATION) | ○ | ○ |

F I G. 1 D

```
<?xml version="1.0" encoding="Shift_JIS" ?>
<eventlist staff="Hiroshi FUJITSU">
   <event type="JOB">
    <start/>
    <info>STARTING</info>
   </event>
</eventlist>
```

FIG. 1F

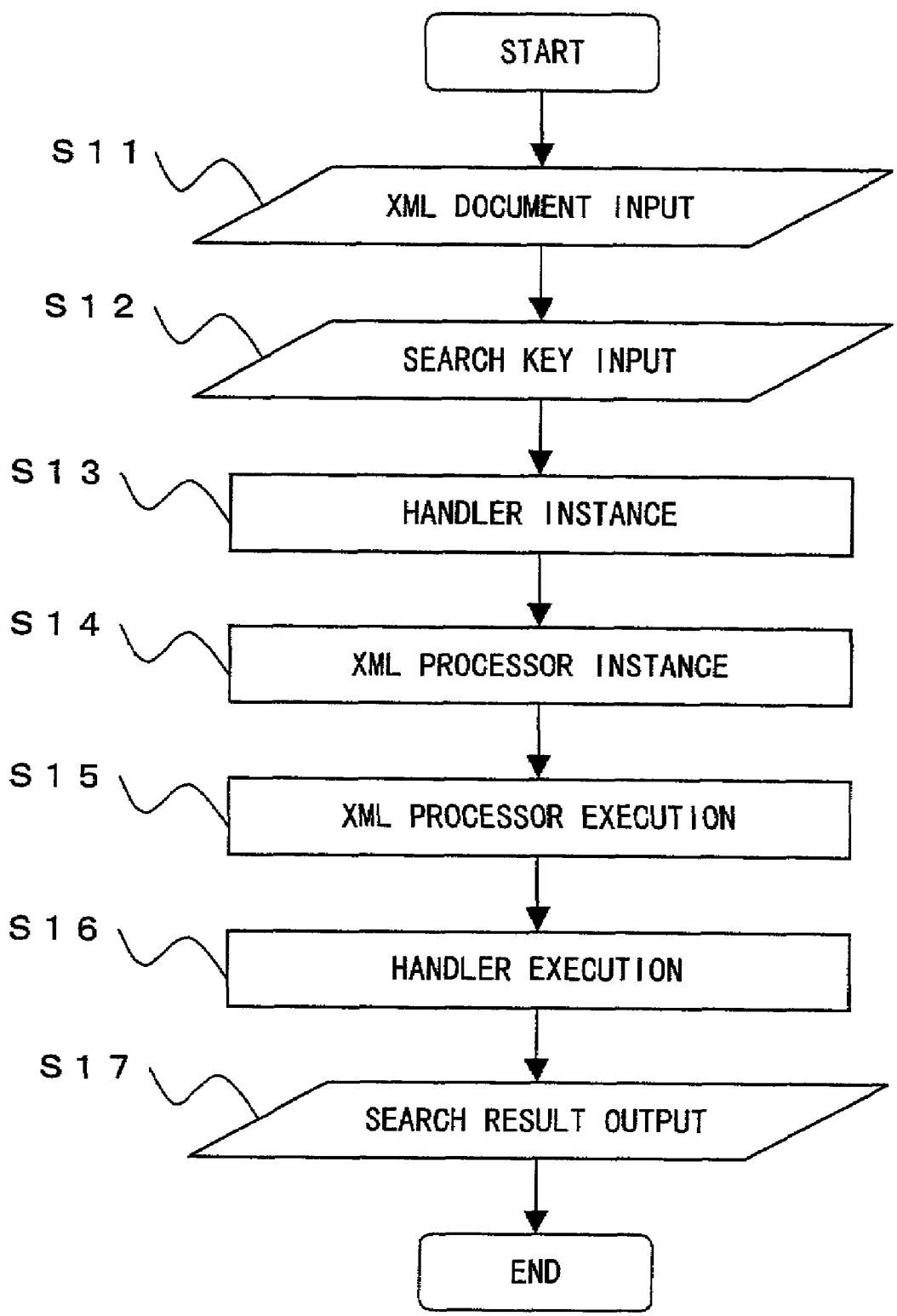
F I G. 1 1

```
<?xml version="1.0" encoding="Shift_JIS" ?>
<eventlist staff="Hiroshi FUJITSU">

<event>
    <info>quitting</info>
</event>
<event>
    <info>starting</info>
    <info>starting</info>
</event>
<event>
    <info>meeting</info>
</event>
<event>
    <info>experiment</info>
</event>
<event>
    <info>business trip</info>
</event>
<event>
    <info>overseas business trip</info>
</event>
<event>
    <info>receiving guest</info>
</event>
<event>
    <info>interview</info>
</event>

</eventlist>
```

P1 SYNTHETIC NON-TARGET

P2 SYNTHETIC TARGET

P3 SYNTHETIC TARGET

P4 SYNTHETIC TARGET

FIG. 2B

```
<?xml version="1.0" encoding="Shift_JIS" ?>
<eventlist staff="Hiroshi FUJITSU">
        first
        <event>
                <start>8:40</start>
                <info>starting</info>
        </event>
        second
        <event>
                <info>quitting</info>
        </event>
        third
        <event>
                <start>9:00</start>
                <info>receiving guest</info>
        </event>
        fourth
        <event>
                <start>9:30</start>
                <info>meeting</info>
        </event>
</eventlist>
```

FIG. 4

```
<?xml version="1.0" encoding="Shift_JIS" ?>
<eventlist staff="Hiroshi FUJITSU">
        first@second@third@fourth
        <event>
                <start>8:40@@9:00@9:30</start>
                <info>starting@quitting@receiving_guest@meeting</info>
        </event>
</eventlist>
```

F I G. 7

| HASH VALUE | ELEMENT NAME OF ANCESTOR/PARENT | OWN ELEMENT NAME | CONTENT OF ELEMENT |
|---|---|---|---|
| H1 | Event | Info | starting@quitting@ receiving guest@meeting |
| H2 | Event | Start | 8:40@@9:00@9:30 |
| | | | |

F I G. 8

| HASH VALUE | ELEMENT NAME OF ANCESTOR/PARENT | OWN ELEMENT NAME | CONTENT OF ELEMENT |
|---|---|---|---|
| H3 | Event | Info | starting@quitting@ receiving guest@meeting |
| H4 | Event | Start | 8:40@17:00@9:00@9:30 |
| | | | |

F I G. 9

```
<?XML version="1.0" ?>
<DOCTYPE doc>
<doc>
<personal>
<family name>Suzuki</family name>
<first name>Sayuri</first name>
<former name>Ogawa</former name>
</personal>
<personal>
<family name>Sato</family name>
<first name>Ichiro</first name>
</personal>
</doc>
```

F I G. 1 0

```
<?XML version="1.0" ?>
<DOCTYPE doc>
<doc>
<personal>
<family name>Suzuki@Sato</family name>
<first name>Sayuri@Ichiro</first name>
<former name>Ogawa@</former name>
</personal>
</doc>
```

F I G. 1 1

```
<?XML version="1.0" ?>
<DOCTYPE doc>
<doc>
<personal>
<family name>Suzuki</family name>
<first name>Sayuri</first name>
<former name>Ogawa</former name>
</personal>
</doc>
```

FIG. 12

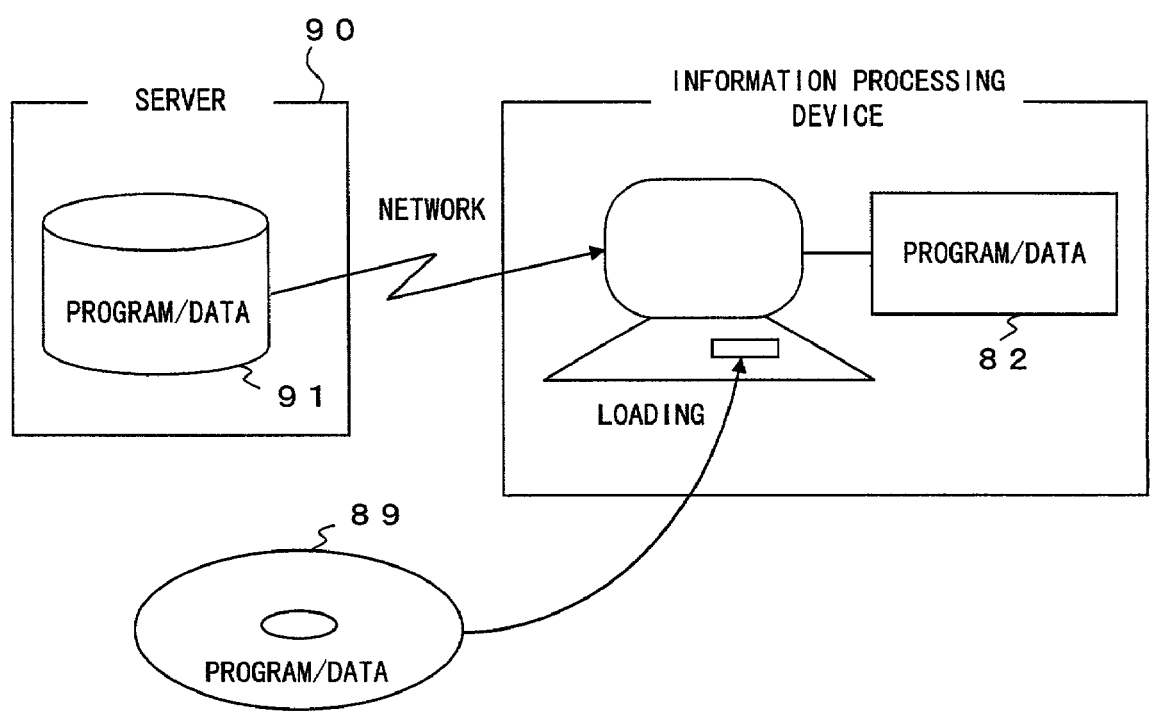
F I G. 19

CONVERTING A STRUCTURED DOCUMENT USING A HASH VALUE, AND GENERATING A NEW TEXT ELEMENT FOR A TREE STRUCTURE

BACKGROUND OF THE INVENTION

1. Field of the Invention

The present invention relates to a process for searching a structured document written with a set of hierarchical elements, and more particularly, to an apparatus converting the structure of a document in order to search for an element of the structured document.

2. Description of the Related Art

A description form of a structured document is typified by SGML (Standard General Markup Language) intended for a large-scale database, HTML (Hyper Text Markup Language) having a simple configuration intended for the WWW (World Wide Web), XML (extensible Markup Language) obtained by simplifying SGML for the Internet, etc. HTML has been popularized as the contents form of the WWW on a worldwide scale. Especially, XML has been attracting attention as a complement for HTML in recent years. XML not only describes a document on the Internet, but also has been becoming a medium via which all types of information appliances such as a cellular phone, a car navigation system, etc. make communications.

The summary of an XML document written in XML is introduced, for example, by "Extensible Markup Language (XML) 1.0 (Second Edition)". An XML document is composed of three major portions such as an XML declaration 11, a DTD (Document Type Definition) 12, and an XML implementation value (instance) 13 as shown in FIG. 1A. The portion of the XML implementation value is written with a set of hierarchical elements, and tags are used as marks for identifying the elements.

FIG. 1B shows how to write a tag indicating one element. In FIG. 1B, a portion of "element content", which is written between a start tag 21 and an end tag 22 including an element name, indicates the content of an element. An empty element tag 23 indicates the tag of an element the content of which is empty. Additionally, how to write a tag indicating a hierarchical structure where a statement and a low-order element coexist as the content of an element is shown in FIG. 1C. In this figure, an element b is inserted between contents 1 and 2 of an element a, and the element b exists below the element a. In this case, the elements a and b have a parent-child relationship.

Furthermore, if attributes are given to an element, attribute names and attribute values are written in the start tag of the element as follows.

<element name attribute name 1="attribute value 1" attribute name 2="attribute value 2" . . . >

An XML document falls into two types such as a wellformed type and a valid type from a processing viewpoint. The relationship between the configuration of a structured document including such two XML document types and its processing category is shown in FIG. 1D. This figure shows whether or not ((○) or (⊃)) a declaration, a document type definition, and an implementation value are indispensable for each of a well-formed XML document, a valid XML document, an SGML document, and an HTML document. By way of example, for the well-formed XML document, only an implementation value is indispensable, and a declaration and a document type definition are not always required.

Software acting as a intermediary that parses an XML document and passes the parsed document to another application software such as a browser, etc. is called an XML processor (parser). The summary of the XML processor is introduced by "Document Object Model (DOM) Level 2 Core Specification Version 1.0 W3C Recommendation Nov. 13, 2000" and "SAX2.0: The Simple API for XML".

FIG. 1E exemplifies the process performed by an XML processor. In this figure, an XML processor 32 checks a given XML document 31, and passes an XML document 33 represented by a tree structure to application software 34. If a document type definition is included in the XML document 31 at this time, only the tagging form of an XML implementation value is checked.

For such an XML processor, there are two types of API (Application Programming Interface) for manipulating an XML document with Java (TM) language: SAX (Simple API for XML), and DOM (Document Object Model). SAX is an event-driven API that notifies application software of an event such as the start or the end of a document or an element, a character string appearance etc., while reading an XML document.

In the meantime, DOM is a general-purpose XML operation API. DOM expands an XML document in a memory as a DOM tree structure. Application software then performs an operation for the DOM object, so that it can access the XML document. Additionally, the original XML document can be restored from the DOM object.

For example, a DOM tree structure shown in FIG. 1G is generated from the XML document shown in FIG. 1F. In FIG. 1G, each of arrows indicates a method (function) for calling each node, and a Document 41 corresponds to an interface representing the whole of the XML document.

Additionally, a NodeList 42 is used to manage lower elements and character data, which belong to a certain node, in an appearance order within the XML document, and has instances such as an Element 43, a Text 44, etc. as lower nodes. A NamedNodeMap 45 is a collection for accommodating nodes that have no meaning in their arrangement order, but whose values must be referenced by using their names as keys. An attribute (Attr 46), etc. are written in the NamedNodeMap 45.

As a typical application example of an XML document, a tag search of an XML document as a database exists. With this process, a portion corresponding to a given search key is searched in an XML document, and a search result is output.

FIG. 1H is a flowchart showing a tag search process using DOM. A process program first inputs an XML document (step S1), and inputs a search key (step S2). Next, the process program generates an instance of an XML processor (step S3), and executes the instance (step S4). As a result, the tag structure of the XML document is parsed, and the DOM tree structure is configured.

Next, the process program traces the tree structure from the root, detects the portion corresponding to the search key, and deletes an unnecessary portion of the tree structure (step S5). In this way, the number of nodes of the tree structure is reduced, and a subtree is generated. The obtained subtree is output as a search result (step S6), and the process is terminated.

If a large-scale database is built with XML, the tag search shown in FIG. 1H is an effective method in a point that the search can be made at considerably high speed. For example, a process such that a hometown is input as a search key, a DOM tree structure is searched, and a subtree of corresponding personal data is left and output in a residents' card database, is enabled.

FIG. 1I is a flowchart showing a tag search process using SAX. The process program inputs an XML document (step S11), and inputs a search key (step S12). Then, the process program generates an instance of a handler (step S13), and generates an instance of an XML processor (step S14), so that the XML processor is executed (step S15).

The XML processor parses the tag structure of the XML document, executes the handler at each detection of a tag, and detects the portion corresponding to the search key (step S16). The XML processor then outputs the obtained search result (step S17). Here, the process is terminated.

However, the above described conventional tag search using DOM has the following problems.

If the scale of a DOM tree structure increases, the same character string as a search key is detected from the content of each element. Therefore, a lot of processing time is required. Additionally, with DOM, a long fixed-length memory region is secured to write data by expecting that a long character string appears in each field. The larger the tree structure, the more the working memory space is required.

SUMMARY OF THE INVENTION

An object of the present invention is to provide a converting apparatus that improves the processing speed of a tag search, and reduces a required working memory amount by converting a structured document such as an XML document.

In a first aspect of the present invention, a converting apparatus comprises a document inputting device, a joining device, a generating device, a converting device, and a document outputting device.

The document inputting device inputs the information of a structured document that is written with a set of hierarchical elements, and composed of a plurality of records each including one element or more. The joining device generates a new element by joining the contents of elements relatively at the same position in two records or more of the structured document.

The generating device generates a new record that includes the generated new element and inherits the relative position relationship of the elements among the two records or more. The converting device converts the structured document by replacing the two records or more with the new record. The document outputting device outputs the structured document after being converted.

In a second aspect of the present invention, a converting apparatus comprises a document inputting device, a joining device, a generating device, a converting device, a document outputting device, a storing device, a duplicating device, and a deleting device.

The document inputting device inputs the information of a structured document written with a set of hierarchical elements. The storing device stores the information of the structured document. The joining device generates a plurality of new elements by joining, as synthesis targets, content of each element included in a combination of elements that successively exist side by side in a level immediately below a certain element and have the same element name, and content of each element included in another combination of elements that have the same element name in a certain level lower than the elements of the former combination, where elements in each level on a route from the elements of the former combination to the certain level have the same element name, in the structured document.

The generating device generates a synthesized substructure that includes the plurality of newly generated elements, and that inherits the relative position relationship of the original elements among the new elements. The duplicating device generates a duplication of an unjoined element in a level immediately below a new element included in the synthesized substructure generated from an element higher than the unjoined element. The deleting device deletes an unnecessary original element.

The converting device converts the structured document into a structured document of a synthetic type configured by a synthesized substructure by using the joining device, the generating device, the duplicating device, and the deleting device. The document outputting device outputs the structured document of a synthetic type.

BRIEF DESCRIPTION OF THE DRAWINGS

FIG. 1A shows the constituent parts of an XML document;
FIG. 1B shows how to write tags;
FIG. 1C shows the hierarchical structure of elements;
FIG. 1D shows the relationship between the configuration of a structured document and its process category;
FIG. 1F shows an XML document;
FIG. 1I is a flowchart showing a tag search process using SAX;
FIG. 2B shows an XML document, which is a first process target;
FIG. 4 shows an XML document, which is a second process target;
FIG. 7 shows a first XML document after synthesis;
FIG. 8 shows a first hash table;
FIG. 9 shows a second hash table;
FIG. 10 shows an XML document, which is a third process target;
FIG. 11 shows an XML document after a second synthesis;
FIG. 12 shows a search result;
FIG. 19 shows storage media.

DESCRIPTION OF THE PREFERRED EMBODIMENTS

Hereinafter, preferred embodiments according to the present invention will be described in detail by referencing the drawings.

Figure 2A:
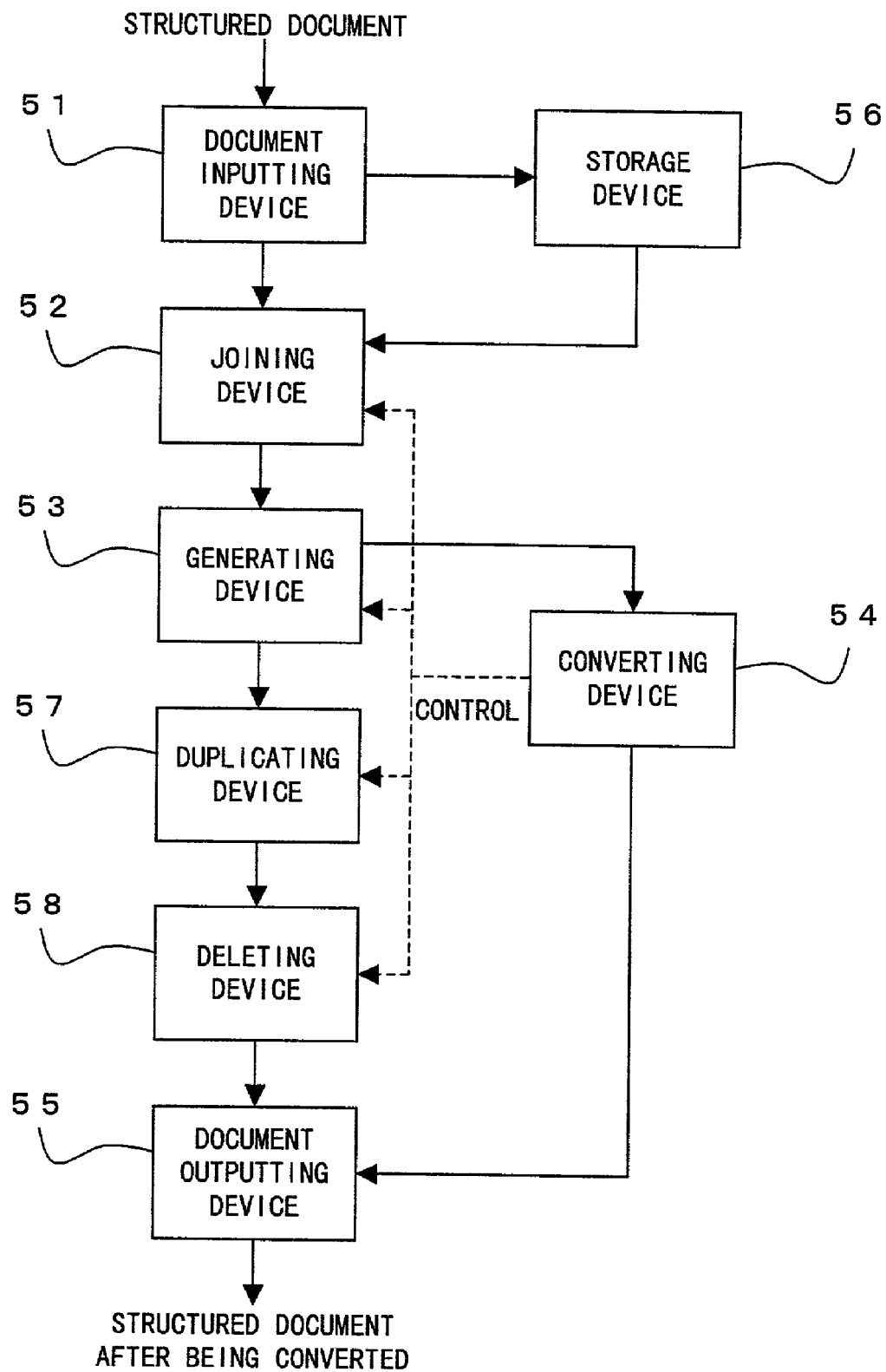
FIG. 2A shows the principle of a converting apparatus according to the present invention.

FIG. 2A shows the principle of a converting apparatus according to the present invention. In a first aspect of the present invention, a converting apparatus comprises a document inputting device 51, a joining device 52, a generating device 53, a converting device 54, and a document outputting device 55.

The document inputting device 51 inputs the information of a structured document that is written with a set of hierarchical elements, and composed of a plurality of records each including one element or more. The joining device 52 generates a new element by joining the contents of elements relatively at the same position among two records or more of the structured document.

The generating device 53 generates a new record that includes the newly generated element, and that inherits the relative position relationship of the elements among the two records or more. The converting device 54 converts the structured document by replacing the two records or more with the new record. The document outputting device 55 outputs the structured document after being converted.

A record corresponds to unit data repeated to configure a structured document, which is composed of a plurality of records. The structured document input by the document inputting device 51 is passed to the joining device 52. The joining device 52 joins the contents of elements at the same position in two records or more by recognizing them as synthesis targets, generates a new element having the joined contents, and passes the element to the generating device 53.

The generating device 53 generates, with the received new element, a new record that inherits the relative position relationship of the elements in the original records before being joined, and passes the generated record to the converting device 54. The converting device 54 generates the structured document after being converted by replacing the original records with the new record, and passes the document to the document outputting device 55. The document outputting device 55 outputs the received structured document as a conversion result.

In the second aspect of the present invention, a converting apparatus comprises a document inputting device 51, a joining device 52, a generating device 53, a converting device 54, a document outputting device 55, a storing device 56, a duplicating device 57, and a deleting device 58.

The document inputting device 51 inputs the information of a structured document written with a set of hierarchical elements. The storing device 56 stores the information of the structured document. The joining device 52 generates a plurality of new elements by joining, as synthesis targets, content of each element included in a combination of elements that successively exist side by side in a level immediately below a certain element and have the same element name, and content of each element included in another combination of elements that have the same element name in a certain level lower than the elements of the former combination, where elements in each level on a route from the elements of the former combination to the certain level have the same element name, in the structured document.

The generating device 53 generates a synthesized substructure that includes the plurality of newly generated elements, and that inherits the relative position relationship of the original elements among the new elements. The duplicating device 57 generates a duplication of an unjoined element below a new element included in the synthesized substructure generated from an element higher than the unjoined element. The deleting device 58 deletes an unnecessary original element.

The converting device 54 converts the structured document into a structured document of a synthetic type configured by a synthesized substructure by using the joining device 52, the generating device 53, the duplicating device 57, and the deleting device 58. The document outputting device 55 outputs the structured document of a synthetic type.

The structured document input by the document inputting device 51 is stored in the storing device 56. The joining device 52 then extracts the information of the structured document from the storing device 56, and selects elements to be synthesized. Here, a combination of elements that successively exist side by side and have the same name among sibling elements existing in a level immediately below a certain element is selected as a first synthesis target. Furthermore, if elements having the same name exist in an arbitrary level lower than the above described elements, and if elements having the same name successively exist also on a route reaching that level, a combination of the elements having the same name in the arbitrary hierarchical level is selected as a second synthesis target.

Next, the joining device 52 joints the contents of the elements having the same name in the respective combinations being the synthesis targets, generates new elements the contents of which are joined, and passes the generated elements to the generating device 53. The generating device 53 generates a synthesized substructure that includes the received new elements and inherits the relative position relationship of the original elements among the new elements, and passes the generated substructure to the duplicating device 57.

If there is an unjoined element, the duplicating device 57 adds a duplication of the unjoined element below a new element included in a synthesized substructure generated from an element higher than the unjoined element. Additionally, the deleting device 58 deletes the original of a joined element and that of a duplicated element. The converting device 54 converts the original structured document into a structured document of a synthetic type by controlling the joining device 52, the generating device 53, the duplicating device 57, and the deleting device 58, and passes the converted document to the document outputting device 55. The document outputting device 55 outputs the received structured document of a synthetic type as a conversion result.

With such a converting apparatus, a plurality of elements of a structured document are synthesized into one, whereby the information of the document is compressed and the memory amount for storing the document is reduced. Additionally, the number of nodes of a tree structure is reduced due to a decrease in the number of elements, thereby improving the speed of a tag search.

Furthermore, even a structured document after being converted inherits the relative position relationship of original elements, so that the original hierarchical structure can be grasped. As a result, application software such as an existing browser, viewer, etc. can be applied to execute the conventional capabilities unchanged. In other words, transparency such that existing application software is made unaware of the conversion of the original document is realized.

Figure 18:
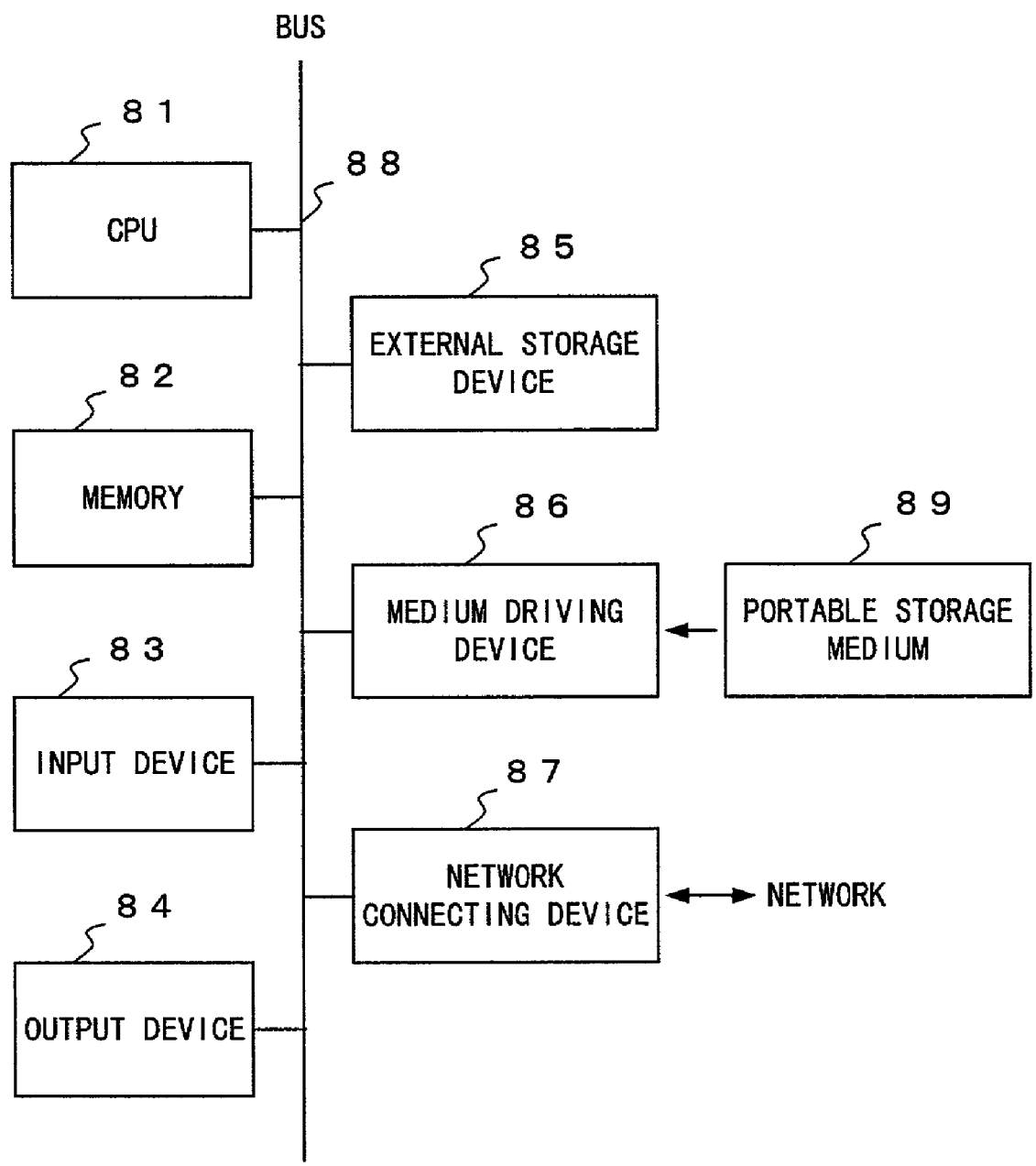
FIG. 18 shows the configuration of an information processing device.

For example, the document inputting device 51 shown in FIG. 2A corresponds to an input device 83 or a network connecting device 87, which is shown in FIG. 18 and will be described later. The storing device 56 shown in FIG. 2A corresponds to a memory 82 or an external storage device 85, which is shown in FIG. 18. Additionally, for instance, the joining device 52, the generating device 53, the converting device 54, the document outputting device 55, the duplicating device 57, and the deleting device 58, which are shown in FIG. 2A, correspond to a CPU (Central Processing Unit) 81 and a memory 82, which are shown in FIG. 18.

Figure 3:
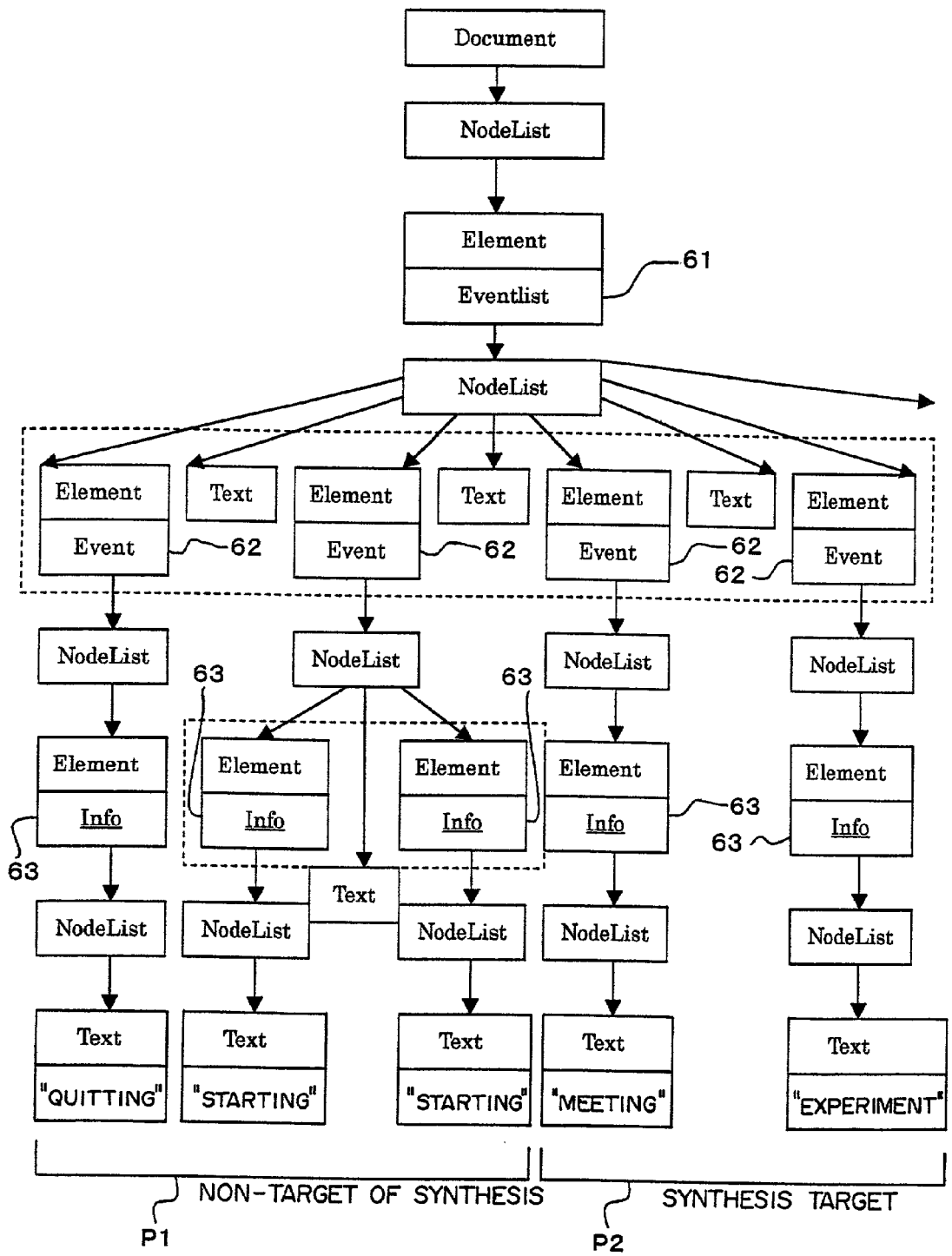
FIG. 3 shows the tree structure of the first process target.

First of all, a synthesis target specification process is explained by assuming that an XML document shown in FIG. 2B is a process target. Normally, an XML document is configured by repeating a plurality of records. By way of example, in the XML document shown in FIG. 2B, the portion from <event> to the next </event> corresponds to one record. If the XML document shown in FIG. 2B is parsed by an XML processor, a DOM tree structure shown in FIG. 3 is obtained. Here, only the first four Event elements among the eight Event elements shown in FIG. 2B are explicitly shown.

In a tree structure, subtrees derived from sibling elements having the same name normally become synthesis targets. In the tree structure shown in FIG. 3, four Event elements 62 successively exist below an Eventlist element 61. A subtree linked to each of the Event elements 62 corresponds to one record. Two Info elements 63 successively exist below the second Event element 62 from the left among the Event elements 61. Only one Info element 63 exists below the first, the third, and the fourth Event elements 62.

Within the subtree linked to the second Event element 62, two Info elements 63, which are children, exist, and each of the Info elements 63 forms a subtree. If such an Event element 62 is specified as a synthesis target, subtrees that are to be synthesized overlap, leading to complexity of a process.

If sibling elements having the same name successively exist in two levels or more as in the subtree of the second Event element 62, this subtree is excluded from synthesis targets. Accordingly, subtrees linked to sibling elements that successively exist and have the same name are specified as synthesis targets if a combination of sibling elements is not found in two levels or more on a route from one of the sibling elements to a certain level.

With an actual process, the converting apparatus detects a node from which elements having the same name successively appear among sibling nodes by referencing the NodeList for each element, and excludes the detected node from synthesis targets. In FIG. 3, four Event elements 62 successively exist. However, since the second Event element 62 has the two successive Info elements 63 in the lower level, this element is excluded from synthesis targets. As a result, the successive Event elements 62 are limited to the third and the fourth elements, so that the subtrees respectively linked to these elements are specified as synthesis targets.

If a plurality of subtrees to be synthesized are obtained as described above, these subtrees are divided into several groups. If two subtrees are collected into one group, a portion P1 composed of the subtrees of the first and the second Event elements 62 is excluded from synthesis targets, and a portion P2 composed of the subtrees of the third and the fourth Event elements 62 becomes a synthesis target. Similarly, portions P3 and P4 of the other Event elements shown in FIG. 2B become synthesis targets.

Additionally, character data (Text), which is the content of the parent of the Event element, is inserted between the parent elements (the Event elements in this case) of the subtrees. Also two pieces of character data accompanying the Event elements 62, which become the synthesis targets, are collected into a group, and recognized as a target to be joined.

Next, a process for synthesizing elements that are specified as synthesis targets is explained by assuming that an XML document shown in FIG. 4 is a process target. Here, suppose that four subtrees are collected into one group, and elements within each group are synthesized. If the XML document shown in FIG. 4 is parsed with an XML processor, a DOM tree structure shown in FIG. 5 is obtained.

Figure 5:
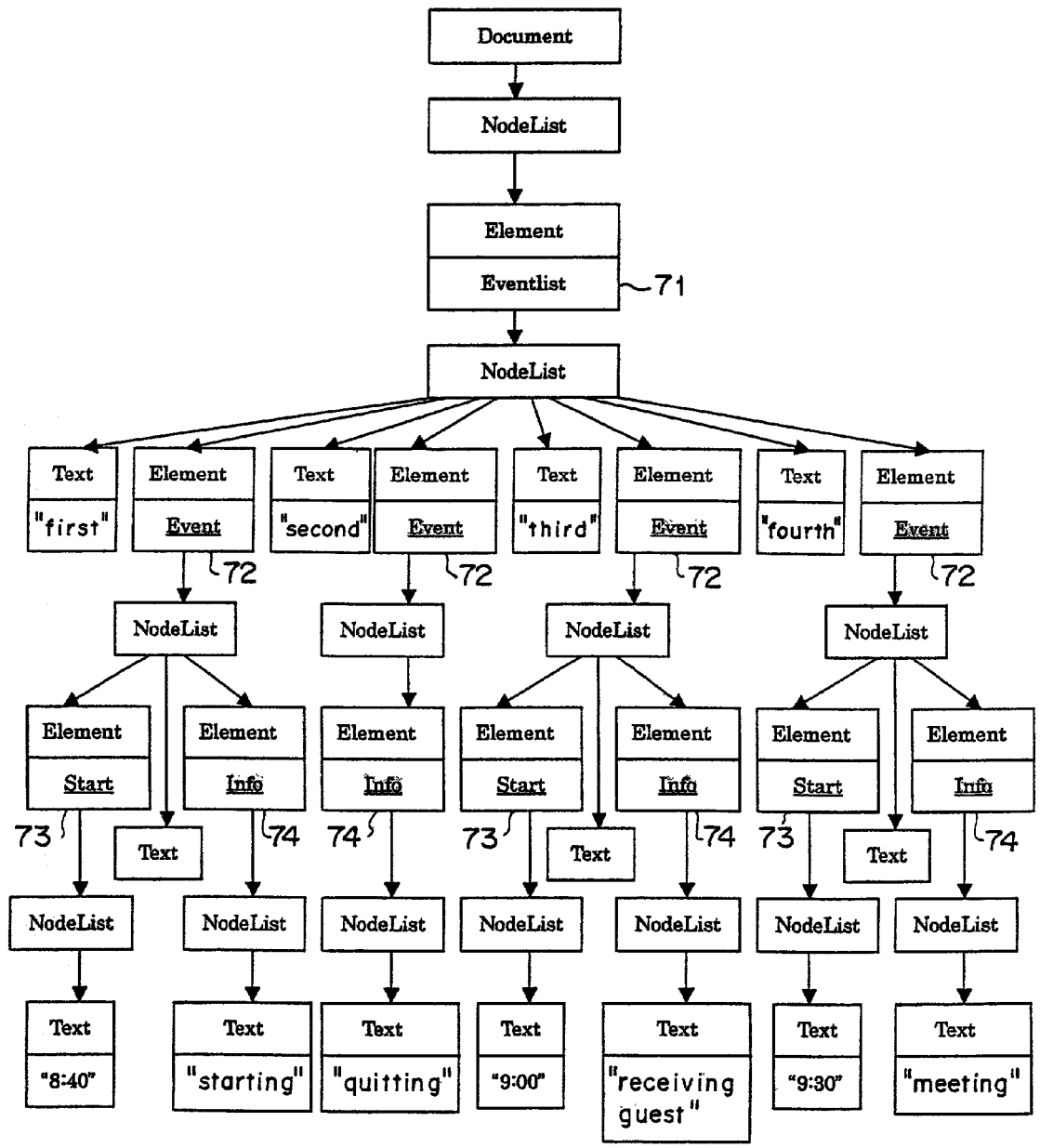
FIG. 5 shows the tree structure of the second process target.

In the tree structure shown in FIG. 5, the converting apparatus joins and registers the contents of elements among nodes whose ancestors have the same element name and which also have the same element name. Because three Start elements 73 possess as their parents the Event elements 72 having the same name in this case, the contents of the Start elements "8:40", "9:00", and "9:30" are joined.

Similarly, four Info elements 74 possess the Event elements 72 as their parents. Therefore, also the contents of the Info elements "starting", "quitting", "receiving guest", and "meeting" are joined. At this time, also the Text (the contents of the Event list element 71 being a parent), which accompanies each of the Event elements 72, is joined and registered.

A delimiter is inserted between the joined contents of two elements in order to indicate a boundary. For an element which exists in one subtree, but not exist (that is, the element is lacking) in another, only the delimiter is appended to the content of the existing element to indicate the lack of the element when being joined. In this case, delimiters are consecutively inserted in the content of a new element.

Figure 6:
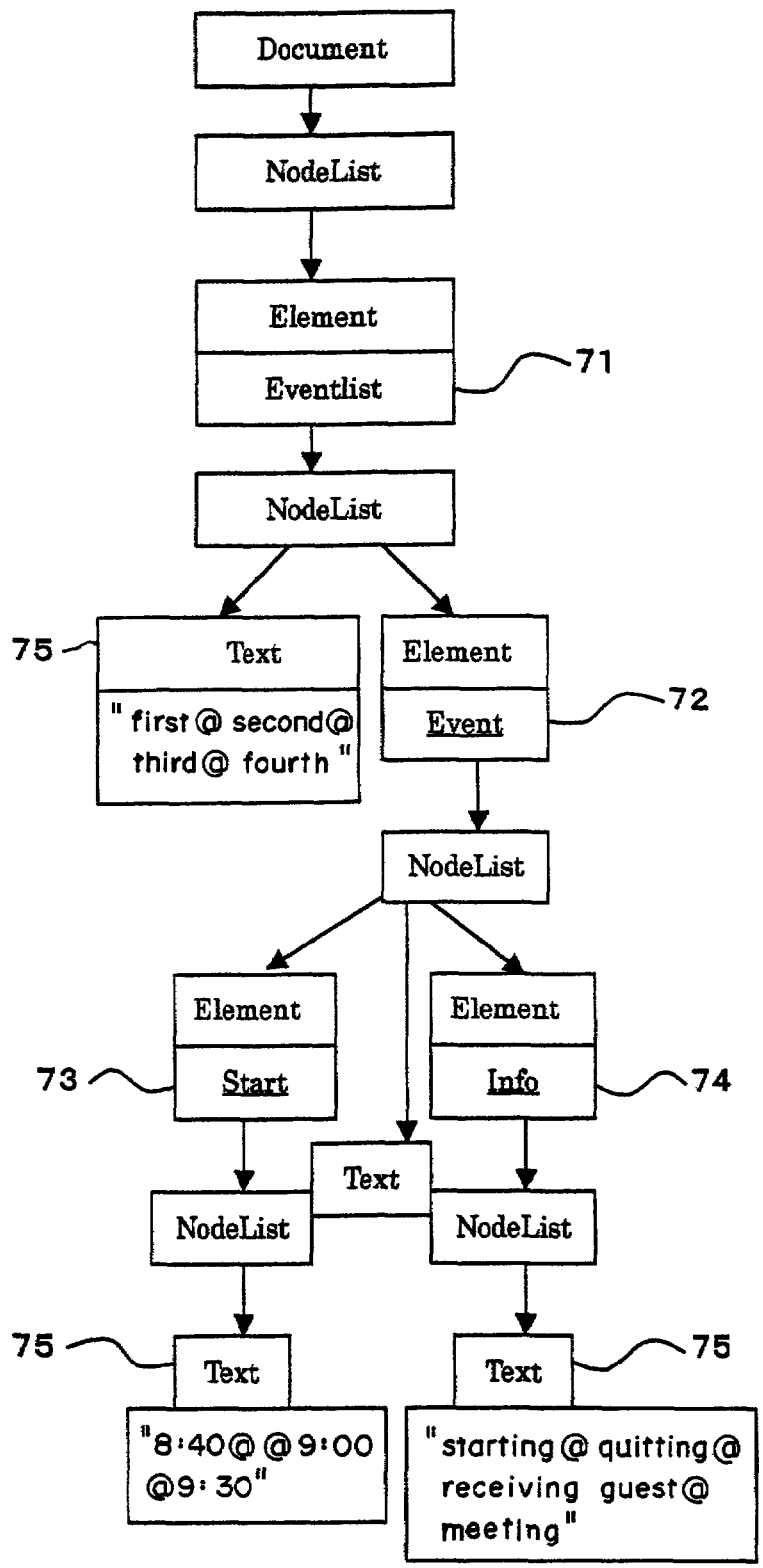
FIG. 6 shows the tree structure after being synthesized.

As described above, the tree structure after the subtrees shown in FIG. 5 are synthesized becomes the one shown in FIG. 6. In FIG. 6, subtrees linked to the Event element 72 correspond to synthesized subtrees, Text 75 indicates the contents of the elements of each of the synthesized subtrees, and @ corresponds to a delimiter. Since the second Event element 72 from the left in FIG. 5 lacks the Start element 73, two delimiters @ are consecutively inserted in the contents of the Start element 73 "8:40@@9:00@9:30".

Furthermore, the XML document after being synthesized, which corresponds to the tree structure shown in FIG. 6, becomes the one shown in FIG. 7. In the XML document shown in FIG. 7, a portion from <event> to the next </event> corresponds to the record of the synthesized subtree. This record indicates the synthesized substructure obtained by synthesizing the elements.

As shown in FIGS. 6 and 7, the contents of elements are joined in an appearance order in the synthesized subtree, and a delimiter @ is inserted between the contents of two elements. If there is no content to be joined, the next @ is inserted without putting a blank space. With such a joining method, the structure of an original subtree can be restored from the positions and the number of delimiters @. Supposing that A@B is written in the Text 75, the element contents corresponding to the first two Event elements 72 are proved to be A and B.

In FIG. 6, the contents of the Event element 72 "first@second@third@fourth" indicate that the contents of the first through the fourth Event elements 72 are respectively the "first", the "second", the "third", and the "fourth". Additionally, the contents of the Info element 74 "starting@quitting@receiving guest@meeting" indicate that the contents of the Info elements 74 succeeding the first through the fourth Event elements 72 are respectively "starting", "quitting", "receiving guest", and "meeting".

In the meantime, the contents of the Start element 73 "8:40@@9:00@9:30" indicate that the contents of the Start elements linked to the first, the third, and the fourth Event elements 72 are respectively "8:40", "9:00", and "9:30", and the second Event element 72 lacks the Start element 73. Accordingly, the tree structure shown in FIG. 5 can be easily restored from the element contents of such a synthesized subtree.

Additionally, if data of a synthesized subtree is stored, the converting apparatus registers to a table a combination of element names on a route from the parent of the subtree to an arbitrary element, and a character string of the joined contents of elements. With such a storing method, even the contents of elements, which belong to different subtrees, can be registered to the same column of the table, if combinations of element names on routes are the same. Consequently, the elements can be joined.

FIG. 8 exemplifies a hash table to which the synthesized subtree shown in FIG. 6 is registered. In the hash table shown in FIG. 8, the joined contents of the Info element are registered to the column of a hash value H1 along with the combination of the parent element name Event and its own element name Info. Additionally, the joined contents of the Start element are registered to the column of a hash value H2 along with the combination of the element names Event and Start.

For example, the hash values H1 and H2 are respectively calculated based on the combinations of the corresponding elements. The synthesized subtree is added to the DOM tree structure based on the hash table thus generated.

The above described synthesis process assumes the case where the structure of an XML document is a normal tree structure. However, if a tree structure is configured by repeating a subtree 1having the exactly the same structure, a simpler process can be adopted. In this case, if the position relationship among elements is written beforehand in software, their contents can be joined without converting the XML document into a tree structure to parse the position relationship among the elements. Accordingly, the converting apparatus calculates hash values from the written position relationship, and registers element contents to the corresponding portion of the hash table.

FIG. 9 exemplifies the hash table used in such a simpler synthesis process. The simpler synthesis process assumes no lack of elements, since this process is applied to a document in which the same substructure is regularly repeated. In the hash table shown in FIG. 9, the element contents similar to those of the Info element shown in FIG. 8 is registered to the column of a hash value H3. However, the element contents with no lack is registered to the column of a hash value H4, unlike the contents of the Start element shown in FIG. 8. For example, the hash values H3 and H4 are respectively calculated based on the positions, the names, etc. of the corresponding elements.

An example of a tag search using an XML document after being synthesized is described next.

In the tag search for the XML document after being synthesized, the converting apparatus compares the character string between two delimiters, which is included in the contents of elements within the document, with the character string of a search key, and detects the character string corresponding to the search key. Next, the converting apparatus obtains the order of the delimiter preceding the detected character string, and extracts the character string between the delimiter having the obtained order and the next delimiter in the contents of the other elements within the same synthesized subtree. The converting apparatus then restores the corresponding portion of the XML document before being synthesized from these character strings, and outputs the restored portion as a search result.

Assuming that the XML document shown in FIG. 10 is a process target, the converting apparatus joins with delimiters contents belonging to elements which have an element name "personal" in a higher level and whose names are the same. As a result, the contents of elements "family name", "first name", and "former name" are joined. The nodes of the original elements are deleted, so that the XML document shown in FIG. 11 is generated.

If a user specifies "Suzuki" as a search key in the tag search for the generated XML document, the converting apparatus searches for a synthesized subtree of the group including "Suzuki" as its element contents. Since there is only one group including "Suzuki" in the document shown in FIG. 11, the whole of this document is obtained as a search result. Then, the converting apparatus leaves the portion corresponding to "Suzuki", and deletes the rest of the obtained result. Consequently, the portion corresponding to "Sato" is deleted, and the search result shown in FIG. 12 is output.

With such a conversion process, a plurality of elements within an XML document are synthesized into one, whereby the information of the document is dramatically compressed. Furthermore, the number of nodes of a tree structure is reduced due to a decrease in the number of elements, thereby significantly shortening a search time required for a tag search.

Next, processes performed by the converting apparatus are described in detail by referencing FIGS. 13 through 17.

Figure 13:
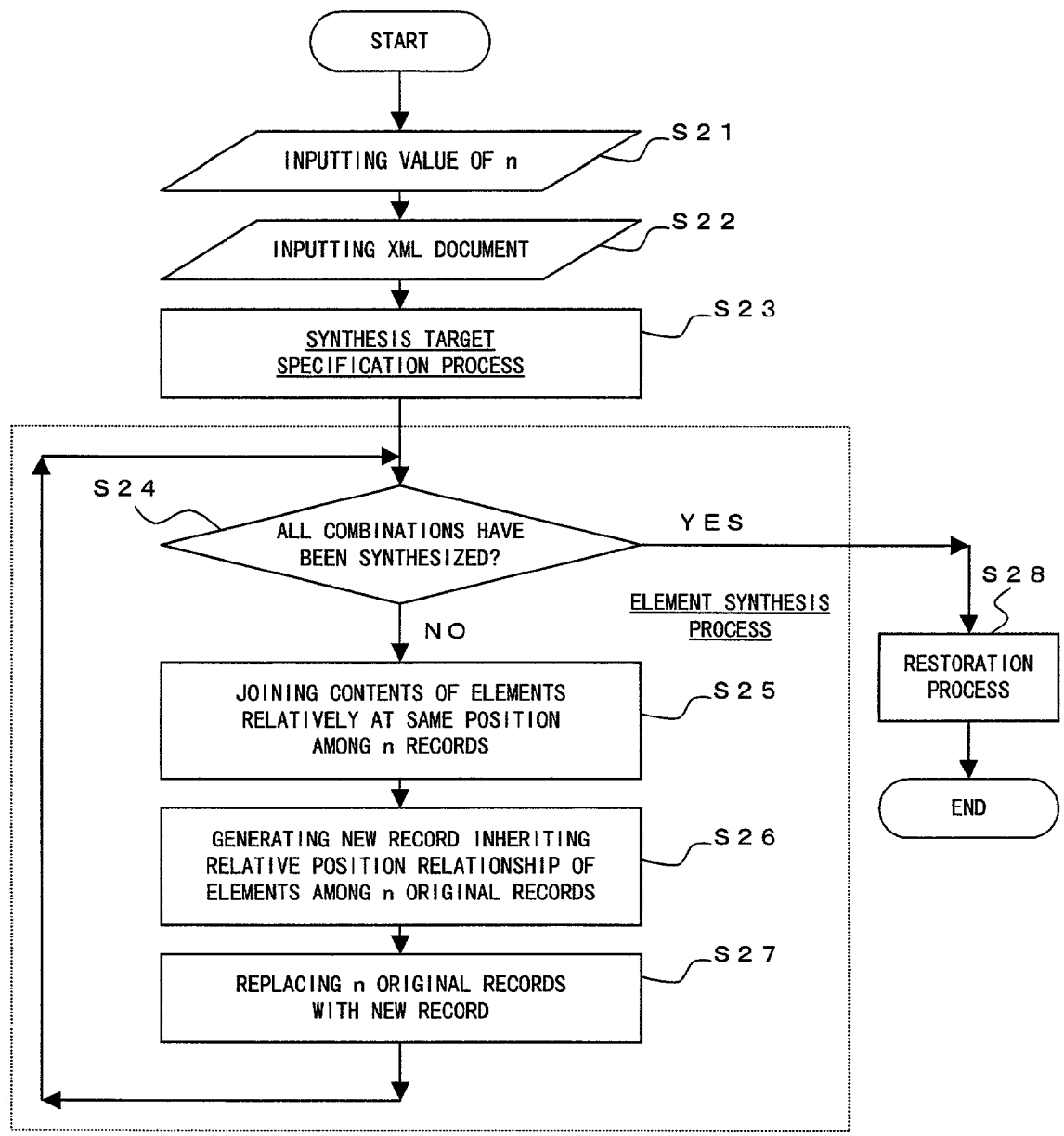
FIG. 13 is a flowchart showing a tag search process including XML document conversion.

FIG. 13 is a flowchart showing the tag search process including XML document conversion. First of all, a user inputs to the converting apparatus a numerical value n for specifying the number of records collected into one group (step S21). This numerical value n is used as a unit in which records are collected into one group in the element synthesis process. Next, the user inputs an XML document to be processed (step S22).

The converting apparatus then specifies a combination (group) of n records to be synthesized within the input XML document by performing the synthesis target specification process (step S23), and performs the element synthesis process (steps S24 through S27).

In the synthesis process, the converting apparatus checks whether or not all of the specified combinations have been synthesized (step S24). If there is a combination yet to be synthesized, the converting apparatus generates one element or more by joining the contents of elements that relatively have the same position relationship among the n records included in this combination (step S25).

Next, the converting apparatus generates a new record that inherits the relative position relationship of elements similar to that of the original records based on the newly generated element (step S26). Then, the converting apparatus deletes the n original records by replacing with the new record (step S27), and repeats the operations in and after step S24.

When all of the specified combinations have been synthesized in step S24, the converting apparatus performs a restoration process (step S28), and terminates the process. With the restoration process, a document converted with the synthesis process is searched with a search key. If an element the content of which includes the same character substring as the search key is detected in a certain record, a character substring corresponding to the position of the detected substring is extracted from the contents of the other elements in that record. Then, a plurality of records before being converted, which include the search key, are restored from the extracted substrings, and output as a search result.

Figure 14:
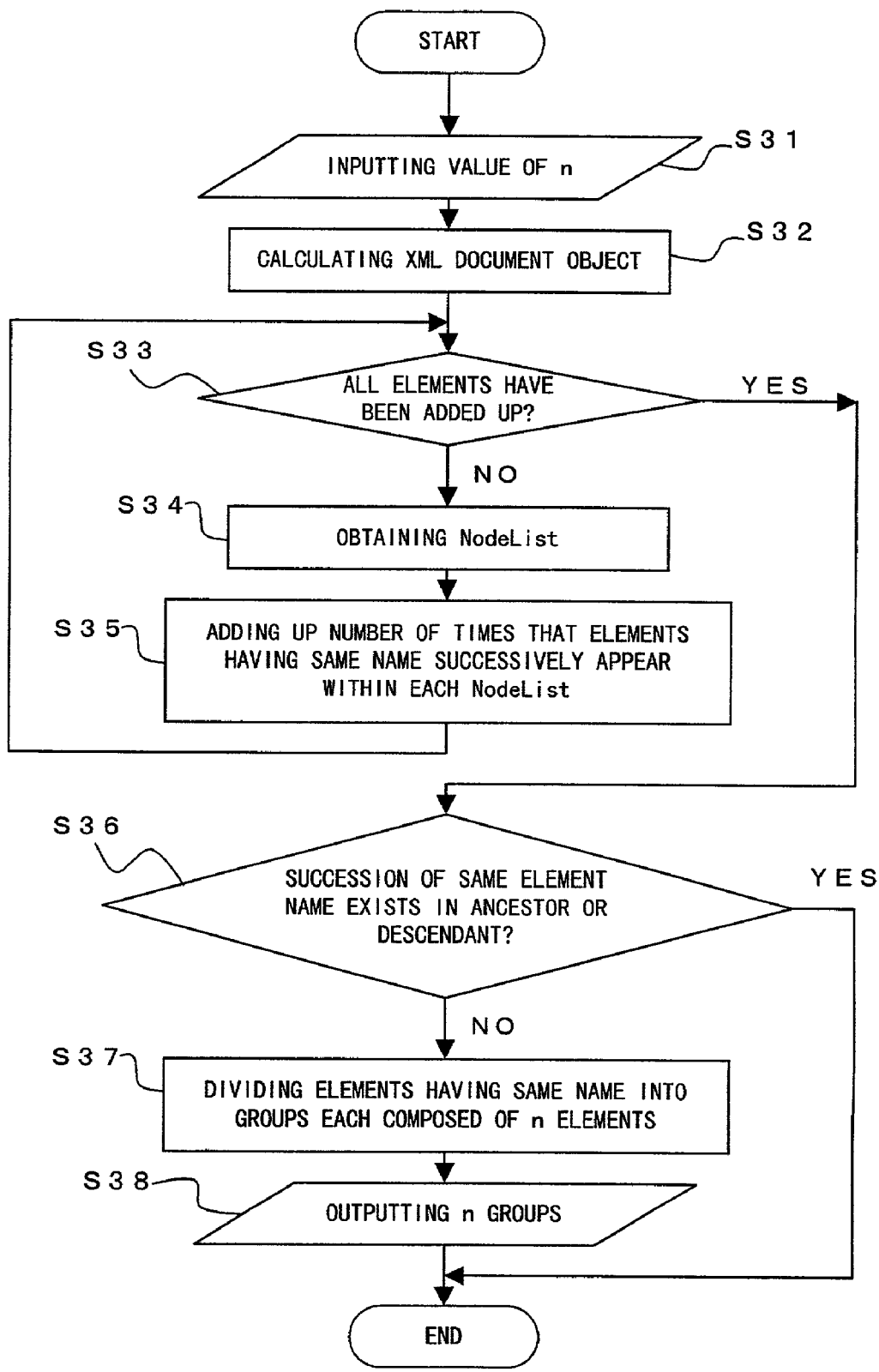
FIG. 14 is a flowchart showing a synthesis target specification process.

FIG. 14 is a flowchart showing the synthesis target specification process performed in step S23 of FIG. 13. With this process, if a plurality of elements having the same name successively exist among sibling elements, these elements are divided into a plurality of groups each composed of a predetermined number of elements, and synthesis targets are specified based on the elements included in the groups.

The converting apparatus first inputs a numerical value n to the synthesis target specification process in order to divide sibling elements having the same name into groups composed of n elements (step S31). Next, the conversion apparatus applies an XML processor to an XML document, calculates an object (DOM) of the XML document, which is configured as a tree structure (step S32), and adds up the number of elements (steps S33 through S35).

With this process, it is first checked whether or not all of the elements of the tree structure have been added up (step S33).

If all of the elements have not been added up yet, a NodeList (a list of linked nodes) belonging to each of the elements is obtained from the tree structure, and stored in a memory (step S34). Then, the number of times that elements having the same name successively appear is added up at the node of a sibling element within each NodeList (step S35), and the operations in and after step S33 are repeated. For example, if an element a, an element a, and an element b appear in this order, the number of times that the element a appears is twice.

If all of the siblings have been added up in step S33, it is then checked whether or not there is a succession of sibling elements having the same name in ancestor or descendant nodes of each of the successive sibling elements having the same name in the tree structure (step S36).

If such a succession is not detected, the succession of sibling elements having the same name exists only among the sibling elements in the level to which attention is currently paid. Therefore, these successive elements are divided into groups each composed of n elements, and the positions of the n nodes are registered (step S37). Then, the obtained groups composed of n elements and their position information are output (step S38). Then, the process is terminated.

If the succession of sibling elements having the same name is detected from the ancestor or the descendant in step S36, it means that the succession of sibling elements having the same name exists in a plurality of levels including the level to which attention is currently paid. Therefore, the element having such an ancestor or a descendant is excluded from synthesis targets.

Figure 15:
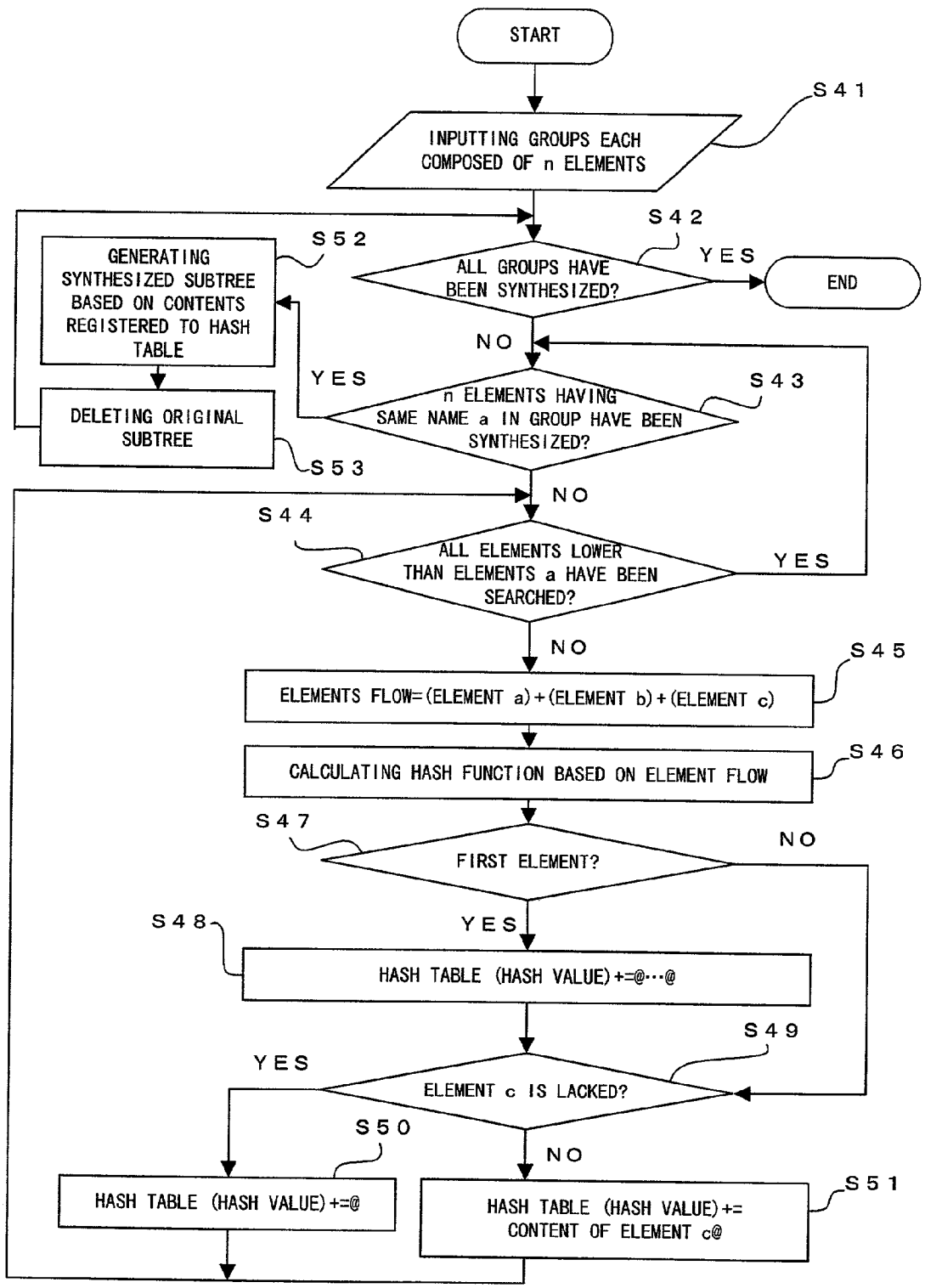
FIG. 15 is a flowchart showing an element synthesis process.

FIG. 15 is a flowchart showing the synthesis process performed in steps S24 through S27 of FIG. 13. The converting apparatus first inputs the groups each composed of n sibling elements having the same name and their position information, which are output from the synthesis target specification process, to the synthesis process (step S41), and checks whether or not all of the input groups have been synthesized (step S42).

If there is a group yet to be synthesized, it is checked whether or not all of the sibling elements having the same name a in that group have been processed (step S43). If there is an element a yet to be processed, the subtree linked to the element a is recognized as a subtree a, and the elements of the subtree a are searched (steps S44 through S51). Supposing that the two elements having the element name a are called a1 and a2, the subtrees linked to these elements become subtrees a1 and a2.

With the search process for the subtree a, it is checked whether or not elements lower than the element a, which is the root of the subtree a, have been searched (step S44). If there is an arbitrary element c yet to be searched, the route from the element a to the element c is searched, and character strings of element names on the route are recorded as an element flow (step S45).

For example, if the elements a, b, and c are searched from upward in this order, (element a)+(element b)+(element c) is recorded as an element flow. An element flow (element a)+(element b)+(element c) belonging to the subtree a1, and an element flow (element a)+(element b)+(element c) belonging to the subtree a2 become identical element flows.

Next, the value of a hash function (the hash value of the element c) is calculated based on the character strings of the recorded element flow (step S46). Here, assuming that integers obtained by converting the character strings of the element names a, b, and c into character codes are respectively Ia, Ib, and Ic, and an exclusive OR EX(abc) between Ia*256, Ib*16, and Ic is obtained, and the hash value is calculated with the following equation.

$$\text{hash value} = EX(abc) \% m$$

where m is an integer prime to 256, and % m indicates a remainder operation with m. At this time, the same element flows belonging to the subtrees a1 and a2 have the same hash value.

Next, it is checked whether or not the element c of the current subtree is a new element that is not included within the processed subtrees in the same group (step S47). If the element c is a new element, delimiters @ are arranged by the number of subtrees a (the number of elements a) processed so far, and registered to a hash value column of the element c in the hash table (step S48). If the number of delimiters @ is large, a continuous length representation may be used.

Next, it is checked whether or not the current subtree lacks the element c, unlike the processed subtrees in the same group (step S49). If the current subtree lacks the element c, a delimiter @ is added and registered to the hash value column of the element c in the hash table (step S50). If the current subtree does not lack the element c, the content of the element c and a delimiter @ are added and registered to the hash value column of the element c in the hash table (step S51). Then, the operations in and after step S44 are repeated.

With the operations in steps S46 through S52, even elements, which belong to different subtrees, have the same hash value if their flows are the same. The contents of these elements are joined with delimiters @ in the column corresponding to the same hash value in the same hash table.

When all of the elements have been searched in step S44, the operations in and after step S43 are repeated. When all of the sibling elements having the same name a have been processed in step S43, it means that the n subtrees belonging to the same group have been joined. Therefore, a synthesized subtree is generated based on the contents registered to the obtained hash table (step S52). If there is an unjoined element at this time, a duplication of the unjoined element is generated below a new element, which is included in the synthesized subtree generated from an element higher than the unjoined element.

Next, the n processed subtrees belonging to the same group are deleted, and only the synthesized subtree is left (step S53). Then, the operations in and after step S42 are repeated. When all of the groups have been synthesized in step S42, the process is terminated. With such a synthesis process, contents of a plurality of corresponding elements are joined, and the contents of the original elements are deleted, so that the document is compressed. The compressed document is stored in an external storage device, etc.

Figure 16:
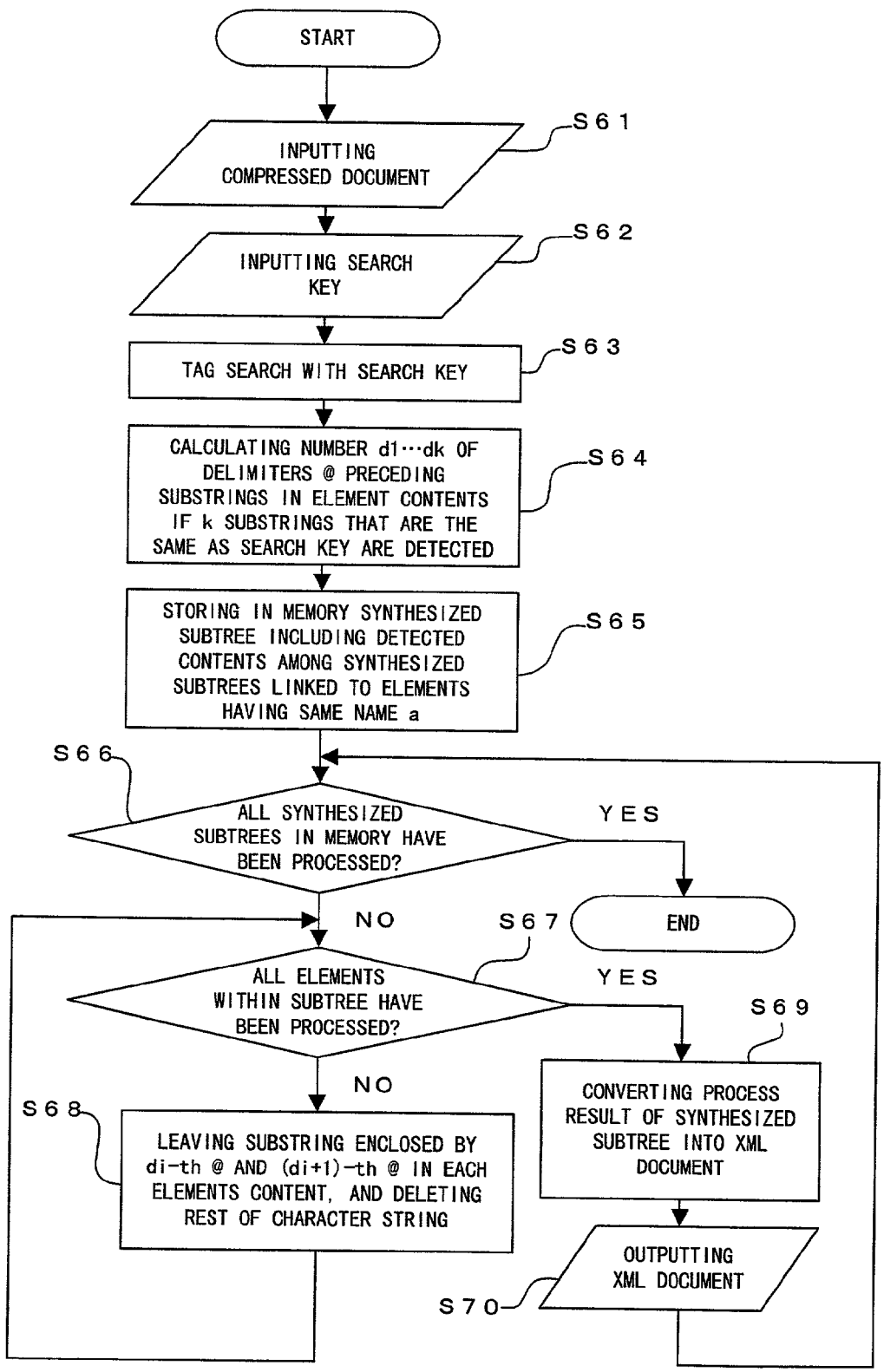
FIG. 16 is a flowchart showing a restoration process.

FIG. 16 is a flowchart showing the restoration process for making a tag search in a compressed XML document, and for outputting a search result. The converting apparatus first inputs a compressed XML document to the restoration process (step S61), and inputs the character string of a search key specified by a user to the restoration process (step S62).

Figure 1E:
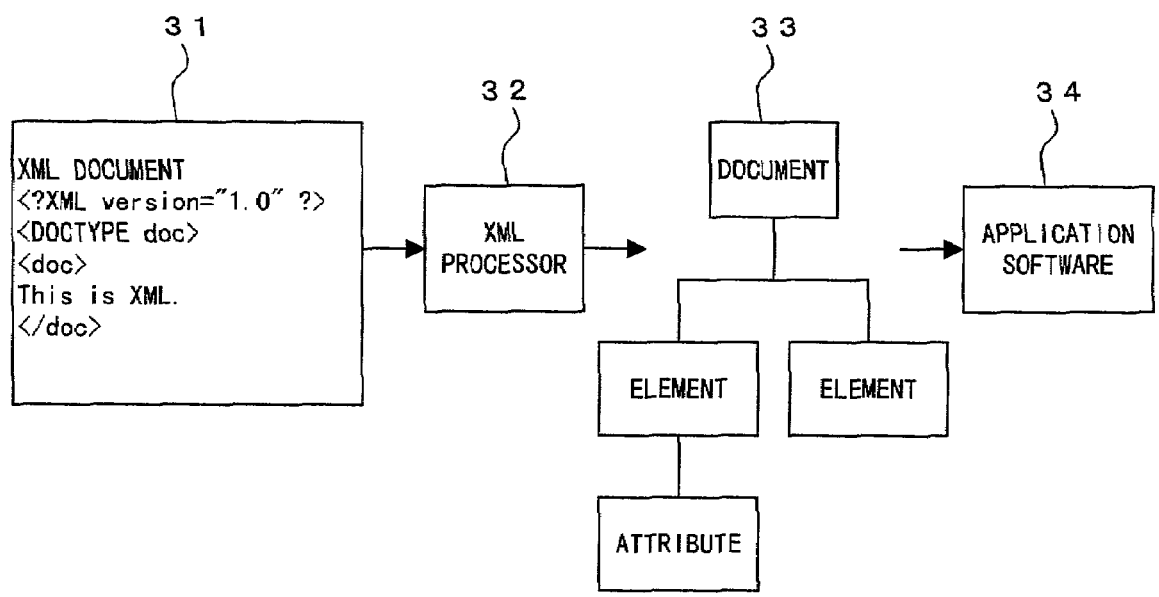
FIG. 1E shows the process performed by an XML processor.
Figure 1G:
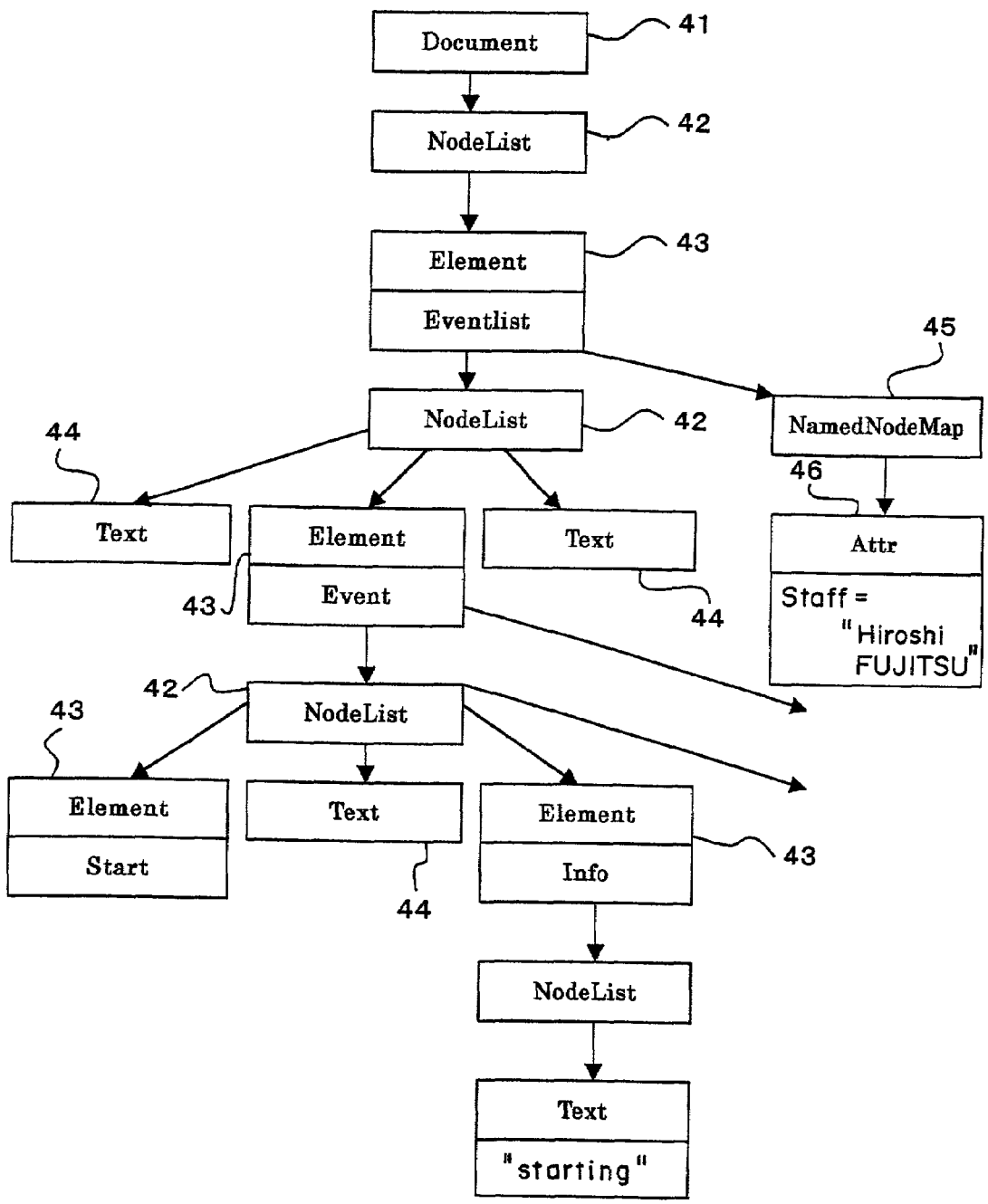
FIG. 1G shows a DOM tree structure.
Figure 1H:
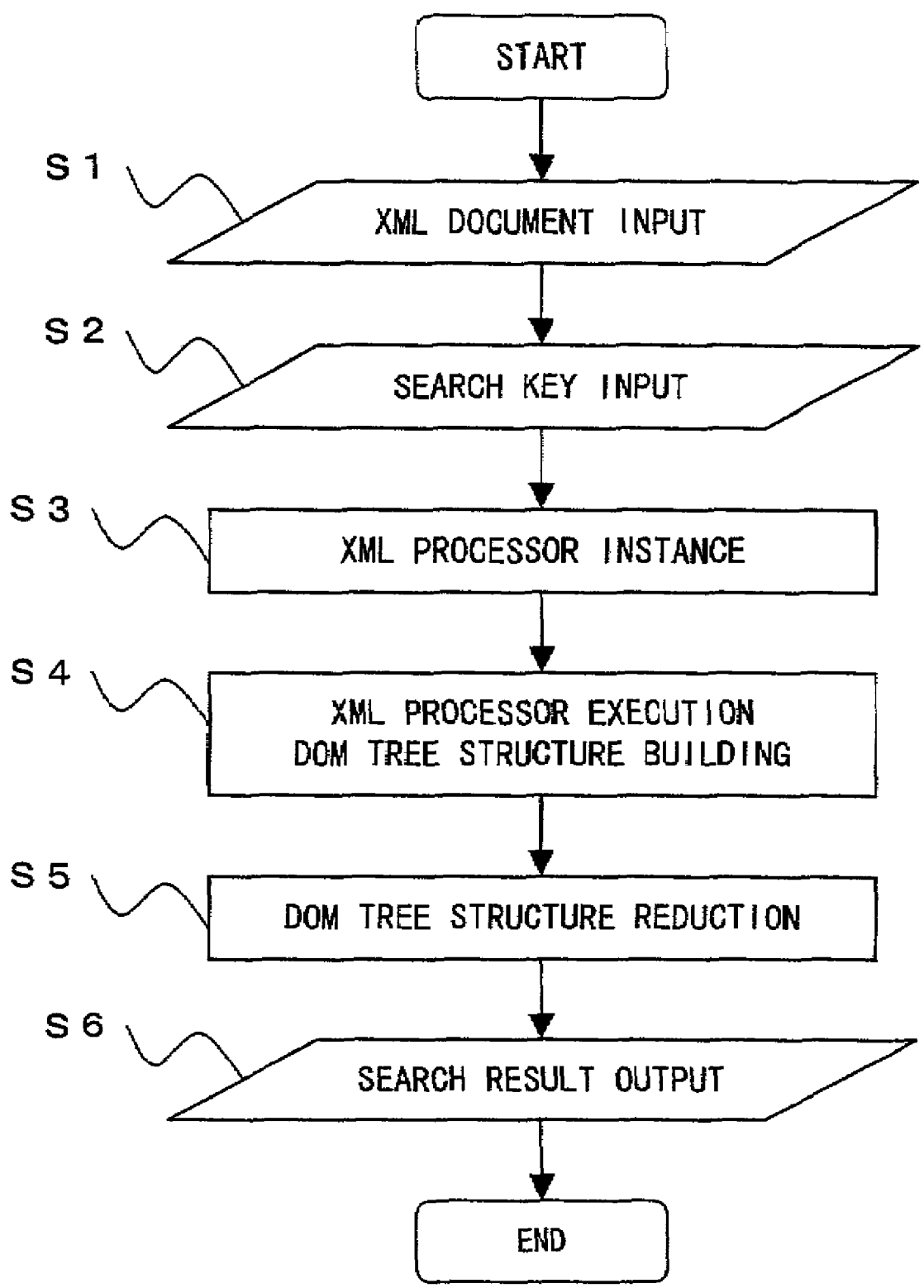
FIG. 1H is a flowchart showing a tag search process using DOM.

Next, a tag search is made in the compressed XML document with the process similar to that shown in FIG. 1H (step S63). With the above described synthesis process, subtrees linked to successive sibling elements having the same name a are synthesized in the original XML document. However, since the fundamental position relationship of elements does not change, transparency is maintained.

If the same character substring as the search key is detected in the contents of the elements of a synthesized subtree, the number d of delimiters @ preceding the substring is calculated (step S64). According to the value of d, the substring corresponding to the search key is proved to exist in the (d+1)-th subtree among subtrees before being synthesized.

If the same substring as the search key is detected in a plurality of portions in the same element contents at this time, the value of d for all of detected character strings is calculated. If k substrings which are the same as the search key (0<k≦n) are detected, $d_1, \ldots, d_k$ are calculated as the numbers of delimiters @ for respective substrings.

Next, among the synthesized subtrees linked to the elements a having the same name, a synthesized subtree including the element contents from which the same substring as the search key is detected is stored in a memory (step S65). The following separation process is performed only for the synthesized subtree stored in the memory. A synthesized subtree stored in an external storage device is not changed.

Next, it is determined whether or not all of the synthesized subtrees stored in the memory have been processed (step S66). If there is a subtree yet to be processed, it is then checked whether or not all of the elements within the synthesized subtree yet to be processed have been processed (step S67).

If there is an element yet to be processed, the substring enclosed by the $d_i$-th @ (i=1, ..., k), and ($d_i$+1)-th @ is left, and the rest of the character string is deleted (step S68). Then, the operations in and after step S67 are repeated. Because such a deletion process for a character string is performed only for a portion of the entire tree structure, the processing speed can be prevented from being degraded by the deletion process.

As a result, substrings in the portions corresponding to the combination of the same values of $d_i$ are extracted in the contents of all the elements, and only the subtree the element contents of which includes the search key is restored among the n original subtrees configuring one synthesized subtree.

When all of the elements have been processed in step S67, the restored original subtree is converted into an XML document (step S69), and the generated XML document is output (step S70). The operations in and after step S66 are then repeated. When all of the synthesized subtrees stored in the memory have been processed in step S66, the restoration process is terminated.

For a document with no lack of elements, in which exactly the same substructure is repeated, there is no need to generate DOM. The above described simpler synthesis process can be used instead of the synthesis target specification process shown in FIG. 14 and the synthesis process shown in FIG. 15.

Figure 17:
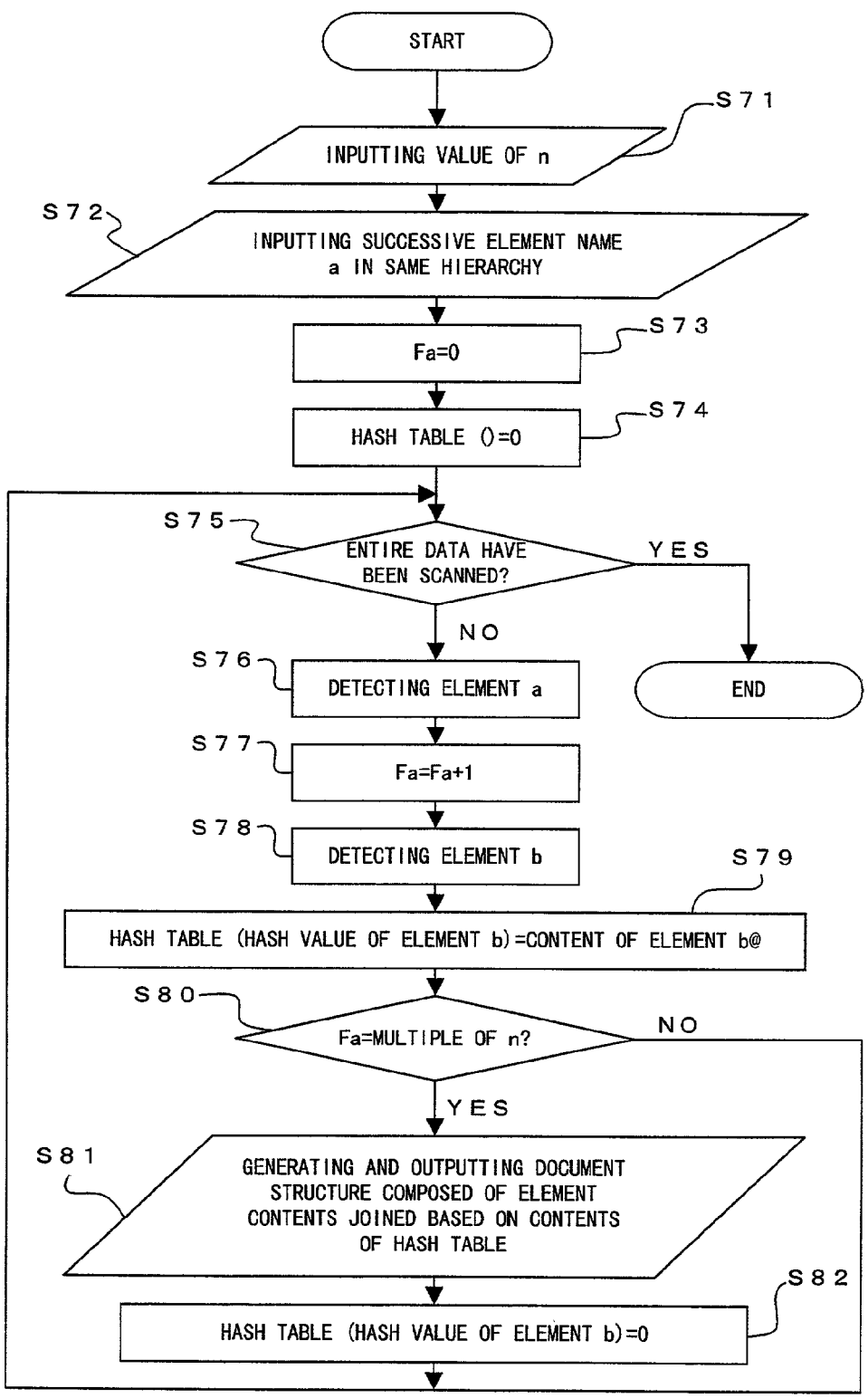
FIG. 17 is a flowchart showing a simpler synthesis process.

FIG. 17 is a flowchart showing such a simpler synthesis process. The converting apparatus first inputs a numerical value n to the simpler synthesis process (step S71), and inputs an element name a which is successive in the same hierarchical level similar to the Event element shown in FIG. 4 (step S72). The converting apparatus initializes a variable Fa which indicates the appearance frequency of the element name a, sets the variable Fa to 0 (step S73), and initializes the contents of the hash table used for registration (step S74).

Next, the converting apparatus checks whether or not the entire data within the XML document has been scanned (step S75). If there is a portion yet to be scanned, the converting apparatus detects the element name a which successively appears from that portion (step S76), and adds 1 to the variable Fa (step S77).

Next, the converting apparatus detects each element b which is linked to the element a (step S78), and adds and registers the content of the element b and a delimiter @ to the column corresponding to the hash value of the element b in the hash table (step S79). Here, it is proved that the parent of the element b is the element a. Therefore, the character string of the element a can be omitted in the calculation of the hash value of the element b. Accordingly, the hash value is calculated with the following equation based on the assumption that the integer which can be obtained by converting the character string of the element b into a character code is Ib.

$$\text{hash value} = Ib \% m$$

Then, the converting apparatus checks whether or not Fa becomes a multiple of n (step S80). If Fa is not a multiple of n, the converting apparatus repeats the operations in and after step S75. As a result, the contents of elements in the same level, which are linked to the plurality of elements a, are joined.

If Fa is a multiple of n in step S80, it means that the synthesis process for one group has been performed. Therefore, the converting apparatus generates a partial document structure generated based on the joined contents of the elements registered to the hash table, and outputs the generated structure (step S81). Next, the converting apparatus initializes the column used for the element b in the hash table in order to get ready for the synthesis of the next group (step S82), and repeats the operations in and after step S75.

When the entire data has been scanned in step S75, the process is terminated. If a tag search is made in the XML document thus generated, use of DOM is also effective. The above described restoration process shown in FIG. 16 is therefore used.

The above described preferred embodiments chiefly refer to an XML document search as an example. The present invention, however, is applicable to structured documents other than an XML document.

The converting apparatus according to the preferred embodiments is configured, for example, by using an information processing device (computer) shown in FIG. 18. The information processing device shown in FIG. 18 comprises a CPU (Central Processing Unit) 81, a memory 82, an input device 83, an output device 84, an external storage device 85, a medium driving device 86, and a network connecting device 87, which are interconnected by a bus 88.

The memory 82 includes, for example, a ROM (Read Only Memory), a RAM (Random Access Memory), etc., and stores a program and data used for processes. The CPU 81 performs necessary processes by executing the program with the memory 82.

The input device 83 is, for example, a keyboard, a pointing device, a touch panel, etc., and is used to input a user instruction or information. The output device 84 is, for example, a display, a printer, a speaker, etc., and is used to output an inquiry to a user or a process result.

The external storage device 85 is, for example, a magnetic disk device, an optical disk device, a magneto-optical disk device, a tape device, etc. The information processing device stores the above described program and data in the external storage device 85, and uses the program and data by loading them into the memory 82 on demand.

The medium driving device 86 drives a portable storage medium 9, and accesses its recorded contents. As the portable storage medium 89, an arbitrary computer-readable storage medium such as a memory card, a floppy disk, a CD-ROM (Compact Disk-Read Only Memory), an optical disk, a magneto-optical disk, etc. is used. A user stores the above described program and data onto the portable storage medium 89, and uses them by loading into the memory 82 as occasion demands.

The network connecting device 87 is connected to an arbitrary communications network such as LAN (Local Area Network), etc., and performs data conversion accompanying a communication. Furthermore, the information processing device receives the above described program and data from a different device such as a server, etc. via the network connecting device 87, and uses them by loading into the memory 82 depending on need.

FIG. 19 shows computer-readable storage media that can provide the information processing device shown in FIG. 18 with a program and data. The program and data stored onto a portable storage medium 89 or in a database 91 of a server 90 are loaded into the memory 82. The CPU 81 then performs necessary processes by executing the program with the data. At this time, the server 90 generates a propagation signal for propagating the program and data, and transmits the signal to the information processing device via an arbitrary transmission medium on a network.

According to the present invention, the number of elements within a structured document decreases, and the document is compressed, so that the memory amount for storing the structured document is reduced. Although subtrees are synthesized, the fundamental relationship among elements is maintained. Therefore, no influence of conversion is exerted on the processes of conventional application software, whereby transparency is maintained.

Furthermore, since the number of nodes in a tree structure decreases, the processing time required for a search is significantly shortened, leading to an improvement in the processing speed of a tag search. For example, if a synthesized subtree is generated before hand from an original structured document off line, the synthesized subtree can be used for the tag search at anytime, and the time taken for the conversion process is not included in the tag search time.

What is claimed is:

1. A converting apparatus, comprising:
a document inputting device inputting information of a structured document that is written with a set of hierarchical elements, and composed of a plurality of records each including one text element or more;
a joining device calculating a tree structure of a document object model of the structured document, obtaining a list of text elements linked to a text element from the tree structure, obtaining text elements having a same element name successively appear in the list as text elements relatively with a same path from a root among two records or more of the structured document, calculating a hash value for element names of text elements on a route from a root of a subtree to each of the text elements relatively with the same path, and generating a new text element by combining contents of the text elements relatively with the same path to preserve a text relationship between the contents if the text elements relatively with the same path have a same hash value;
a generating device generating a new record that includes the new text element and inherits a relative position relationship of text elements in the two records or more;
a converting device converting the structured document by replacing the two records or more with the new record, thereby decreasing the number of hierarchical elements of the structured document and preserving text element information of the records; and
a document outputting device outputting the structured document after being converted.

2. The converting apparatus according to claim 1, further comprising:
a key inputting device inputting a search key; and
a searching device searching the structured document after being converted, extracting a character string corresponding to a position of a detected character string from contents of an element in a certain record when a character string corresponding to the search key is detected from contents of another element in the certain record, deleting character strings at other positions in the contents of the elements in the certain record, restoring a record before being converted, which includes the search key, from the detected character string and the extracted character string, and outputting the restored record as a search result.

3. A converting apparatus, comprising:
a document inputting device inputting information of a structured document written with a set of hierarchical elements;
a storing device storing the information of the structured document;
a joining device calculating a tree structure of a document object model of the structured document, obtaining a first list of text elements linked to a certain text element from the tree structure, obtaining text elements having a same element name successively appear in the first list as a first combination of elements that successively exist side by side in a level immediately below the certain text element in the structured document, obtaining a second list of text elements linked to a text element lower than the certain text element from the tree structure, obtaining text elements having a same element name successively appear in the second list as a second combination of elements which are in a certain level lower than the elements of the first combination, calculating a hash value for element names of text elements on a route from a root of a subtree to each element included in the first and second combination, and generating a plurality of new text elements by combining, as synthesis targets, content of each element included in the first combination and content of each element included in the second combination the combined elements have a same hash value, wherein elements in each level on a route from the elements of the first combination to the certain level have a same element name to each other, so that a text relationship between the combined contents can be preserved;
a generating device generating a synthesized substructure that includes the plurality of new text elements, and inherits a relative position relationship of original elements among the plurality of new text elements;
a duplicating device generating a duplication of an unjoined element below a new element included in a synthesized substructure generated from an element higher than the unjoined element;
a deleting device deleting an unnecessary original element;
a converting device converting the structured document into a structured document of a synthetic type configured by a synthesized substructure by using said joining device, said generating device, said duplicating device, and said deleting device, thereby decreasing the number of hierarchical elements of the structured document and preserving text element information of records; and
a document outputting device outputting the structured document of the synthetic type.

4. The converting apparatus according to claim 3, wherein said generating device generates the synthesized substructure if a combination of elements that successively exist side by side and have a same element name in two levels or more on the route to the certain level is not found.

5. The converting apparatus according to claim 3, wherein said joining device divides the second combination of the elements into a plurality of groups each composed of a predetermined number of elements, and specifies the synthesis targets based on the predetermined number of elements included in each of the groups.

6. The converting apparatus according to claim 3, wherein said joining device generates contents of the new elements by inserting a delimiter between two joined contents.

7. The converting apparatus according to claim 6, wherein said joining device consecutively inserts the delimiter in the contents of the new elements if content of an element which becomes the synthesis targets is lacking.

8. The converting apparatus according to claim 6, further comprising:
a key inputting device inputting a search key; and
a searching device comparing a character string between two delimiters, which is included in contents of elements within the structured document of the synthetic type, with a character string of the search key, obtaining an order of a delimiter preceding a character string corresponding to the search key when the character string corresponding to the search key is detected from contents of an element within a certain synthesized substructure, extracting a character string between a delimiter corresponding to the order and a next delimiter in contents of another element in the certain synthesized substructure, deleting character strings between other two delimiters in the contents of the elements in the certain synthesized substructure, restoring a corresponding portion of the structured document before being converted from the detected character string and the extracted character string, and outputting the restored portion as a search result.

9. A computer-readable storage medium on which is recorded a program for causing a computer to execute a process, said process comprising:
calculating a tree structure of a document object model of a structured document that is written with a set of hierarchical elements and composed of a plurality of records each including one text element or more;
obtaining a list of text elements linked to a text element from the tree structure;
obtaining text elements having a same element name successively appear in the list as text elements relatively with a same path from a root among two records or more of the structured document;
calculating a hash value for element names of text elements on a route from a root of a subtree to each of the text elements relatively with the same path;
generating a new text element by combining contents of the text elements relatively with the same path to p reserve a text relationship between the contents if the text elements relatively with the same path have a same hash value;
generating a new record that includes the new text element and inherits a relative position relationship of text elements in the two records or more, thereby decreasing the number of hierarchical elements of the structured document and preserving text element information of the records; and
converting the structured document by replacing the two records or more with the new record.

10. A converting apparatus, comprising:
document inputting means for inputting information of a structured document that is written with a set of hierarchical elements, and composed of a plurality of records each including one text element or more;
joining means for calculating a tree structure of a document object model of the structured document, obtaining a list of text elements linked to a text element from the tree structure, obtaining text elements having a same element name successively appear in the list as text elements relatively with a same path from a root among two records or more of the structured document, calculating a hash value for element names of text elements on a route from a root of a subtree to each of the text elements relatively with the same path, and generating a new text element by combining contents of the text elements relatively with the same path to preserve a text relationship between the contents if the text elements relatively with the same path have a same hash value;
generating means for generating a new record that includes the text new element and inherits a relative position relationship of text elements in the two records or more;
converting means for converting the structured document by replacing the two records or more with the new record, thereby decreasing the number of hierarchical elements of the structured document and preserving text element information of the records; and
document outputting means for outputting the structured document after being converted.

11. A method of compressing a hierarchically structured document, comprising:
analyzing a hierarchy of the hierarchically structured document; and
combining hierarchical text elements of the hierarchically structured document responsive to common element names for the hierarchical text elements and a common child element structure of the hierarchical text elements and preserving text element information of the text elements, and
wherein the combining calculates a tree structure of a document object model of the hierarchically structured document, obtains a list of hierarchical text elements linked to a hierarchical text element from the tree structure, obtains hierarchical text elements having a same element name successively appear in the list, calculating a hash value for element names of text elements on a route from a root of a subtree to each of the obtained hierarchical text elements, and combines the obtained hierarchical text elements if the obtained hierarchical text elements have a same hash value.

12. A method of compressing a hierarchically structured document, comprising:
analyzing a hierarchy of the hierarchically structured document; and
combining hierarchical text elements of the hierarchically structured document responsive to common features of parts of the hierarchy of the hierarchically structured document and preserving text element information of the text elements, and
wherein the combining calculates a tree structure of a document object model of the hierarchically structured document, obtains a list of hierarchical text elements linked to a hierarchical text element from the tree structure, obtains hierarchical text elements having a same element name successively appear in the list, calculating a hash value for element names of text elements on a route from a root of a subtree to each of the obtained hierarchical text elements, and combines the obtained hierarchical text elements if the obtained hierarchical text elements have a same hash value.

13. A method of compressing a hierarchically structured document, comprising:
analyzing a hierarchy of the hierarchically structured document; and compressing the hierarchy of the structured document by combining text element content and preserving a hierarchically defined relationship and text element information of text elements, and wherein the compressing calculates a tree structure of a document object model of the hierarchically structured document, obtains a list of hierarchical text elements linked to a hierarchical text element from the tree structure, obtains hierarchical text elements having a same element name successively appear in the list, calculating a hash value for element names of text elements on a route from a root of a subtree to each of the obtained hierarchical text elements and combines the obtained hierarchical text elements if the obtained hierarchical text elements have a same hash value.

* * * * *

UNITED STATES PATENT AND TRADEMARK OFFICE
CERTIFICATE OF CORRECTION

| | |
|---|---|
| PATENT NO. | : 7,519,903 B2 |
| APPLICATION NO. | : 09/819729 |
| DATED | : April 14, 2009 |
| INVENTOR(S) | : Hironori Yahagi |

Page 1 of 1

It is certified that error appears in the above-identified patent and that said Letters Patent is hereby corrected as shown below:

Column 17, Line 48, change "p reserve" to --preserve--.

Column 20, Line 5, change "elements and" to --elements, and--.

Signed and Sealed this

Thirtieth Day of June, 2009

JOHN DOLL
*Acting Director of the United States Patent and Trademark Office*